US007917769B2

(12) United States Patent
Campisi

(10) Patent No.: US 7,917,769 B2
(45) Date of Patent: *Mar. 29, 2011

(54) TRANSACTION AUTHENTICATION CARD

(75) Inventor: Steven E. Campisi, Elkhorn, NE (US)

(73) Assignee: Resilent, LLC, Omaha, NE (US)

( * ) Notice: Subject to any disclaimer, the term of this patent is extended or adjusted under 35 U.S.C. 154(b) by 157 days.

This patent is subject to a terminal disclaimer.

(21) Appl. No.: 12/319,848

(22) Filed: Jan. 13, 2009

(65) Prior Publication Data

US 2009/0201128 A1   Aug. 13, 2009

Related U.S. Application Data

(63) Continuation of application No. 10/844,262, filed on May 12, 2004, now Pat. No. 7,543,156, which is a continuation of application No. 10/603,887, filed on Jun. 25, 2003, now abandoned.

(60) Provisional application No. 60/463,297, filed on Apr. 16, 2003, provisional application No. 60/417,607, filed on Oct. 10, 2002, provisional application No. 60/391,532, filed on Jun. 25, 2002.

(51) Int. Cl.
| | |
|---|---|
| H04K 1/00 | (2006.01) |
| H04L 9/00 | (2006.01) |
| G05B 19/00 | (2006.01) |
| G06F 7/00 | (2006.01) |
| G06F 7/04 | (2006.01) |
| G06K 9/00 | (2006.01) |
| G06T 1/00 | (2006.01) |
| G06T 7/00 | (2006.01) |
| G08B 29/00 | (2006.01) |
| G08C 19/00 | (2006.01) |
| H04Q 9/00 | (2006.01) |
| H04Q 1/00 | (2006.01) |

(52) U.S. Cl. ........ 713/186; 713/169; 340/5.53; 340/5.6; 705/51; 705/65; 705/67

(58) Field of Classification Search .................. None
See application file for complete search history.

(56) References Cited

U.S. PATENT DOCUMENTS

| | | | |
|---|---|---|---|
| 3,673,331 | A | 6/1972 | Hair et al. |
| 3,812,461 | A | 5/1974 | Lemelson |
| 3,940,795 | A | 2/1976 | Lemelson |
| 4,202,120 | A | 5/1980 | Engel |
| 4,202,927 | A | 5/1980 | Yamaguchi et al. |
| 4,253,086 | A | 2/1981 | Szwarcbier |

(Continued)

OTHER PUBLICATIONS

VeriFinger—Fingerprint Identification System, Fingerprint Identification Software: Libraries and Source Code, Jun. 10, 2003, 2003 Neurotechnologija, Ltd., 5 pages.

(Continued)

Primary Examiner — Shin-Hon Chen
(74) Attorney, Agent, or Firm — Suiter Swantz pc llo

(57) ABSTRACT

A transaction authentication card uses a biometric input and a wireless output. The biometric input may be a sensor pad on the transaction authentication card that measures blood flow patterns, temperature, and/or fingerprint patterns to identify a user to permit access. The transaction authentication card is preferably substantially rigid, but may be formed to have some flexibility. Power to the transaction authentication card may be accomplished through an internal battery that is optionally rechargeable. Biometric data is stored on the card only and used for user verification. Biometric data will not be transferred from the card. If authorized biometric data is authenticated the card will transmit a wireless access code to a proximity reader or transaction equipment.

6 Claims, 19 Drawing Sheets

U.S. PATENT DOCUMENTS

| | | | |
|---|---|---|---|
| 4,256,955 | A | 3/1981 | Giraud et al. |
| 4,353,056 | A | 10/1982 | Tsikos |
| 4,455,083 | A | 6/1984 | Elmes |
| 4,471,343 | A | 9/1984 | Lemelson |
| 4,546,241 | A | 10/1985 | Walton |
| 4,575,621 | A | 3/1986 | Dreifus |
| 4,582,985 | A | 4/1986 | Lofberg |
| 4,614,861 | A | 9/1986 | Pavlov et al. |
| 4,667,087 | A | 5/1987 | Quintana |
| 4,677,657 | A | 6/1987 | Nagata et al. |
| 4,760,245 | A | 7/1988 | Fukaya |
| 4,782,455 | A | 11/1988 | Morinouchi et al. |
| 4,802,218 | A | 1/1989 | Wright et al. |
| 4,864,115 | A | 9/1989 | Imran et al. |
| 4,926,325 | A | 5/1990 | Benton et al. |
| 4,983,036 | A | 1/1991 | Froelich |
| 4,995,086 | A | 2/1991 | Lilley et al. |
| 5,321,765 | A | 6/1994 | Costello |
| 5,623,552 | A | 4/1997 | Lane |
| 5,680,460 | A | 10/1997 | Tomko et al. |
| 5,734,154 | A | 3/1998 | Jachimowicz et al. |
| 5,832,090 | A | 11/1998 | Raspotnik |
| 5,864,580 | A | 1/1999 | Lowe et al. |
| 6,035,398 | A | 3/2000 | Bjorn |
| 6,038,666 | A | 3/2000 | Hsu et al. |
| 6,111,977 | A | 8/2000 | Scott et al. |
| 6,182,221 | B1 | 1/2001 | Hsu et al. |
| 6,202,927 | B1* | 3/2001 | Bashan et al. ............ 235/451 |
| 6,353,889 | B1 | 3/2002 | Hollingshead |
| 6,408,330 | B1 | 6/2002 | DeLaHuerga |
| 6,442,286 | B1 | 8/2002 | Kramer |
| 6,484,260 | B1 | 11/2002 | Scott et al. |
| 6,502,748 | B2 | 1/2003 | Berg et al. |
| 6,618,806 | B1 | 9/2003 | Brown et al. |
| 6,766,040 | B1 | 7/2004 | Catalano et al. |
| 6,928,547 | B2 | 8/2005 | Brown et al. |
| 6,970,584 | B2 | 11/2005 | O'Gorman et al. |
| 7,111,324 | B2 | 9/2006 | Elteto et al. |
| 2001/0015382 | A1 | 8/2001 | Tiffany, III |
| 2002/0095587 | A1* | 7/2002 | Doyle et al. ............ 713/186 |
| 2002/0095588 | A1* | 7/2002 | Shigematsu et al. ........ 713/186 |
| 2002/0104006 | A1 | 8/2002 | Boate et al. |
| 2002/0126882 | A1 | 9/2002 | Funahashi |
| 2002/0138438 | A1* | 9/2002 | Bardwell ............ 705/51 |
| 2002/0188863 | A1 | 12/2002 | Friedman |
| 2003/0005336 | A1* | 1/2003 | Poo et al. ............ 713/202 |
| 2003/0014649 | A1 | 1/2003 | Funahashi |
| 2003/0046553 | A1 | 3/2003 | Angelo |
| 2003/0095690 | A1 | 5/2003 | Su et al. |
| 2003/0173408 | A1 | 9/2003 | Mosher, Jr. et al. |
| 2003/0189481 | A1* | 10/2003 | Hamid ............ 340/5.53 |
| 2003/0201755 | A1 | 10/2003 | Briggs et al. |
| 2004/0238621 | A1 | 12/2004 | Beenau et al. |

OTHER PUBLICATIONS

HID Corporation-Wiegand Products, Cards and Readers for Access Con, http://www.hidcorp.com/products/wiegand_readers_cards.html, Jun. 21, 2003, 9 pages.

CR-1/TR-1, Wiegand Card Readers, Northern Computers; Printed in NL 2001, 2 pages.

Securing the Information Age: *TouchChip Platform for Embedded Biometric Subsystems,; TouchChip Active Capacitive Fingerprint Sensing*, and *TouchChip PerfectMatch, High-performance Template Recognition System*; STMicroelectronics, Copyright 2001, www.st.com.

Biometric Sensors—Fujitsu Microelectronics Europe, Jun. 10, 2003, 2 pages.

Fingerprint Identification, Biometrics at Michigan State University, biometrics@cse.msu.edu/fingerprint.html; Jun. 10, 2002, 3 pages.

Douglas Mcarthur, Fingerprint Identification and Authentication, Sensors—Jan. 2003; Biometrics Sensor Group, Fujitsu Microelectronics America, San Jose, CA, Jun. 10, 2003.

DigitalPersona White Paper Guide to Fingerprint Identification, Digital Persona providers of U.are.U Fingerprint Recognitions System, 805 Veterans Blvd., Redwood City, CA 94063 USA; www.digitalpersona.com, US Government Printing Office 1939, 12 pages.

Richard Shim, Philips, Visa Wave Wireless Credit Card, CNET News.com; May 29, 2003: http://msn.com/2100-1103_2-1010724.html?type=pt.

* cited by examiner

TRANSACTION AUTHENTICATION CARD

CROSS REFERENCE TO RELATED APPLICATIONS

The present application is a continuation of U.S. Non-Provisional patent application Ser. No. 10/844,262, filed on May 12, 2004 now U.S. Pat. No. 7,543,156 which is a continuation-in-part application claiming priority under 35 U.S.C. §120 to the U.S. Non-Provisional patent application Ser. No. 10/603,887, filed on Jun. 25, 2003 now abandoned, which claimed priority under 35 U.S.C. 119(e) to U.S. Provisional Patent Application Ser. Nos. 60/463,297, filed Apr. 16, 2003, 60/417,607, filed Oct. 10, 2002, and 60/391,532, filed Jun. 25, 2002. The U.S. Non-Provisional patent application Ser. Nos. 10/844,262 and 10/603,887 and the U.S. Provisional Patent Application Ser. Nos. 60/463,297, 60/417,607 and 60/391,532 are herein incorporated by reference in their entireties.

FIELD OF THE INVENTION

The present invention generally relates to transaction authentication cards, and particularly to transaction authentication cards having a biometric sensor for authentication.

BACKGROUND OF THE INVENTION

Security is of concern to businesses and individuals for a plethora of reasons, including the prevention of identity theft, property theft, industrial espionage, invasion of privacy, and terrorism. Accordingly, transaction authentication cards have been developed that allow an individual to access a room or building or to access sensitive information. The current security provided by a transaction authentication card is inadequate for secure operations such as physical access control, logical access control, and financial transaction authentication because unauthorized users may now use transaction authentication cards. There is a need for a reliable way to authenticate a user.

Therefore, it would be desirable to provide a transaction authentication card that uses biometrics to verify that the person in possession of the card is in fact the authorized and authenticated user.

SUMMARY OF THE INVENTION

Accordingly, the present invention is directed to a transaction authentication card incorporating biometric verification technologies and methods.

In a first aspect of the present invention, a transaction authentication card, comprises a biometric sensor for sensing a biometric feature of a user; a memory; a processor and a keypad for enabling the user to selectively interface with the processor and memory. Wherein the transaction authentication card is enabled to retrieve stored biometric data from the card's memory, the processor having a fingerprint matching algorithm for comparing a biometric feature of a user with the stored biometric data in the card. The transaction authentication card further includes a wireless transmitter for transmitting a wireless transaction protocol signal.

In a second aspect of the present invention, a method for providing limited access comprises the steps of determining the functional mode of the transaction authentication card, placing the transaction authentication card within proximity of a limited access control device; and entering biometric input through a sensor located on the transaction authentication card, wherein the transaction authentication card communicates with a limited access control device through wireless communications. The wireless signal transmits a protocol only and not the biometric data.

The present invention provides an identification card that does not require external equipment for identity verification, physical access control, logical access control, financial transaction authentication, and terminal login authentication. A major advantage of the present invention is that the user does not have to provide his or her biometrics to a database that is not controlled by him or her. The transaction authentication card allows biometric data collection on the transaction authentication card's database that is controlled by the user. Authentication is accomplished on the card for a one to one verification.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
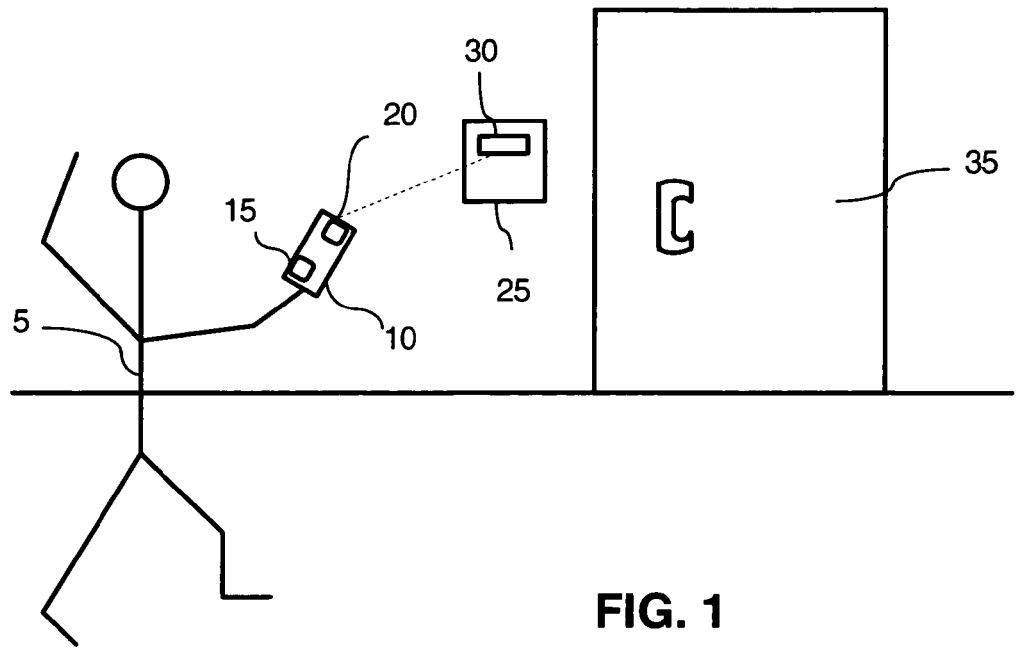
FIG. 1 illustrates a method of use of the present invention.

The present invention relates to a transaction authentication card having an antenna that emits radio frequencies compliant with FCC standards and formats for access control market place (e.g., HID Mifare). The transaction authentication card does not contain an operating system and does not contain a desktop application. The transaction authentication card is not a personal digital assistant (PDA), a palmtop computer, or a palm pilot, although the method of the present invention may be used with these devices. The card may be a proximity card or an access card for access control to buildings (ingress/egress control), financial transactions, security transactions, government control, airline security, passport ID, drivers' license/driver authentication, toll road payment and automated teller machine transactions. The transaction authentication card provides a portable database and does not require an outside source for biometric enrollment. As shown in FIG. 1, a user 5 may place a finger on a sensor 15 and, upon authentication, cause a wireless signal from an on-card transmitter 20 to be received by a sensor 30 on an access control box 25. In one embodiment, enrollment of the user occurs when the first user presses his or her finger onto the biometric sensor. In this embodiment, no other person is thereafter able to enroll or use the card. The present invention provides an identification card that does not require external software/equipment for identity verification, access control, and terminal login authentication. The transaction authentication card preferably includes a fingerprint sensor for authenticating the identity of a person, a processor that has the software on board to drive the verification, and access control.

Figure 2:
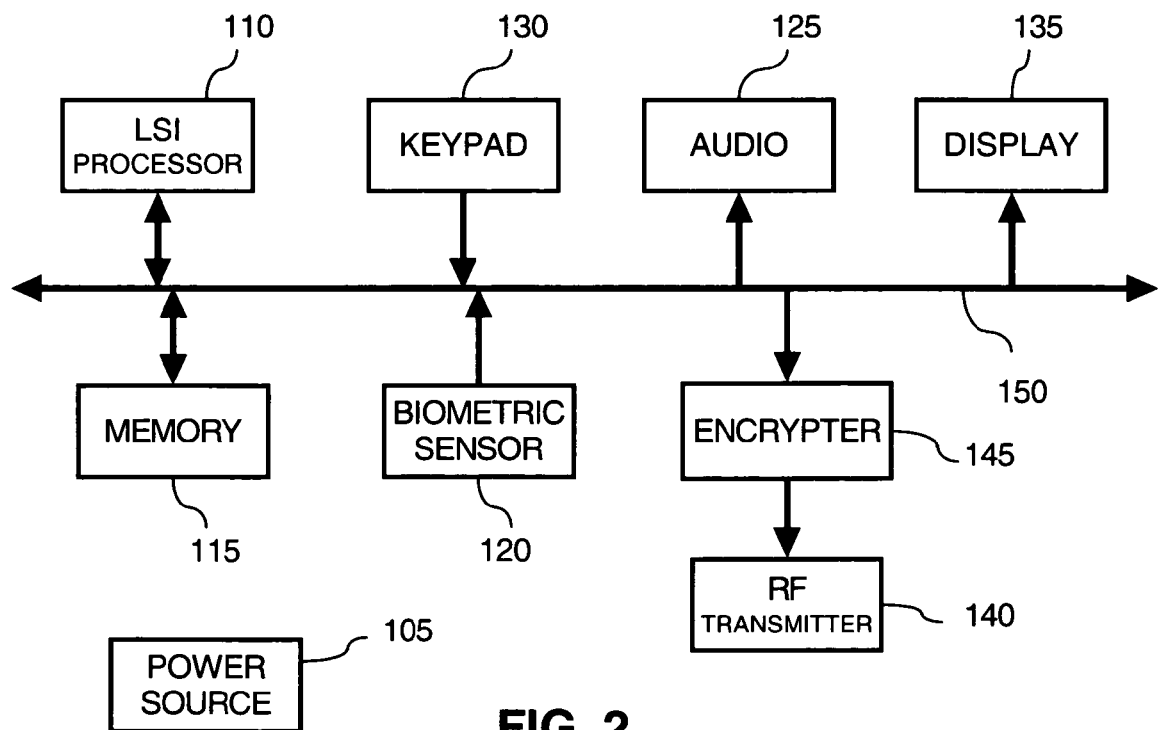
FIG. 2 illustrates a functional block diagram of the transaction authentication card of the present invention.

FIG. 2 shows a functional block diagram of the circuitry of the transaction authentication card of the present invention. A large scale integrated (LSI) processor 110 controls the circuitry and, preferably, encrypts all biometric data as well as any other sensitive data, such as personal identification numbers. If reverse engineering were to be attempted, in the preferred embodiment, all the stored data would appear as characters similar to hieroglyphics. The LSI processor 110 may be implemented through field programmable gate array, programmable logic device, or other suitable technology and includes a biometric processor (i.e., engine) for enrollment and verification.

The enrollment and verification technology may functionally enable the use of the transaction authentication card within various systems employing a variety of technologies. In a preferred embodiment, the LSI processor 110 in operational concert with the biometric processor provides for the use of the transaction authentication card within a system enabled via a public-key infrastructure (PKI) standard. It is understood that the PKI may be an open PKI system or closed PKI system. Various enterprises may desire to protect the security of their communications and transactions over networks, such as the Internet, an Intranet, a Wide Area Network (WAN), a Local Area Network (LAN), and the like. Combining software, encryption technologies, and services, PKI assists and enables the securing of these communications and transactions over a diverse array of networks. PKIs integrate digital certificates, public-key cryptography, and certificate authorities into a total, enterprise-wide network security architecture. PKIs provide numerous benefits, such as assisting in ensuring privacy, support for non-repudiation, authentication and verification of user identity, and authorization of access and transactions.

Thus, the transaction authentication card of the present invention, in essence provides a platform upon which a software application, encryption technology, and services of an individual PKI system may be enabled. In operation with a PKI system, the transaction authentication card of the present invention provides a digital signature (certificate) which embeds with a private key. The digital certificate may be variously configured to provide a server certificate or a personal certificate. The private key, based on the authentication of the user's biometric information, corresponds to a public key. The public key which corresponds to the private key may be stored in a memory communicatively coupled with the LSI processor 110. It is understood that numerous public keys may be stored within the transaction authentication card. The public key is transmitted to a receiving unit and may be authenticated by the digital certificate. The digital certificate is from a third party certification authority (CA). The digital certificate, which embeds information into the public key and binds the identity of the user to the digital certificate, may have its information stored in various locations upon the transaction authentication card. The digital certificate embedded with the transaction authentication card may have its information of the stored in the memory of the transaction authentication card. The embedded information of the digital certificate from the CA verifies the public key as corresponding to the appropriate private key. This example illustrates one standard currently being developed and employed. It is understood that the present invention may be employed to operate within various other standards.

The LSI processor 110 may act as a central processing unit (CPU). Enrollment is defined as the process used to collect, build and store in memory the biometric "signature" or "template" of the enrollee or "owner". It is against this "signature" or "template" that the cardholders' biometric data collected at the time of attempted authentication/verification will be matched. When the present invention is being employed within a PKI enabled system, the enrollment (biometric signature) generates a private key which corresponds to a public key that may be used for certification by a certification authority within the PKI system. In this document, authentication and verification should be used interchangeably. Authentication/verification is the process of comparing the cardholders collected biometric data against the stored biometric "signature" or "template" (collected at enrollment) in order to achieve a match, thereby "authenticating" the cardholder as the card owner. As to the device, this authentication is of course necessary prior to the device sending its signal (either through an RF interface, through the "smart card" interface, or through a "wired" (Serial, USB, etc) connection or interface).

Biometrics encompassed by the present invention include retinal scans and iris scans, voiceprints, handprints, footprints, fingerprints, palmprints, and handwriting. Preferably, the biometric processor verifies the cardholder's fingerprint against the stored template and sends a wireless signal to an access control device such as one that conforms to the proximity systems that are on the open market. The biometrics matching algorithm may be customized or may be a commercially available algorithm such as through Verifinger (e.g., the Touch Chip sensor), Fujitsu (e.g., the MBF300 SweepSensor), DigitalPersona, or the like which uses industry standard minutia points (i.e., local ridge characteristics at a ridge split or termination) for validation/authentication. The transaction authentication card processing software may also have the capability of having a settable resolution threshold for biometric matching. For example, fingerprint matching may be accomplished by the matching of a settable number of points, such as six points or sixteen points. Setting of the number of points is preferably done by the manufacturer, but may be specified by the user. The transaction authentication card incorporates memory that stores fingerprint information about the transaction authentication card owner. The memory includes read only memory (ROM), such as electrically erasable programmable read only memory (EEPROM) or flash memory, to store card identification information for communications with external enrollment or access devices. The ROM preferably also stores the biometric data. In the preferred embodiment, volatile memory (e.g., random access memory or RAM) temporarily stores the data to be transmitted through the wireless transmitter. The card serial number may be hardwired on the card by tying certain signals as highs and lows to represent a bit pattern that identifies the card. Alternatively, the memory may include static random access memory (static RAM) such that when the power source is dead or disconnected, all biometric data is erased.

Preferably, smart chip technology is used. Smart Chip Technology (SCT) refers to an embedded chip common in new style "smart card" credit/debit cards where account information is contained on the chip. The device would require authentication prior to releasing data contained on the "smart chip." The device may use SCT simply as a storage medium for the enrollee's biometric signature or as an actual interface to a commercially available "smart card" reader, thus enabling "smart card" transactions in a merchant—consumer, or other financial transaction environment. (Examples would be credit/debit cards, calling cards, stored value cards, ATM cards, etc.)

The preferred transaction authentication card communications gateways are PCMCIA, serial, universal serial bus (USB), and radio frequency (RF). In an embodiment, the smart chip itself may be used as a communications port. A transaction authentication card having a PCMCIA interface is preferably connected to a desktop computer via a USB serial data interchange. Biometric and other data for enrollment is registered on the transaction authentication card by enrollment software resident on the desktop computer or on another registration device. The enrollment data stored on the card is continuously available to a user with verifiable biometric input.

In FIG. 2, the LSI processor 110 receives input from the biometric sensor 120 and sends a signal, upon authentication of a user, to an encrypter 145 that provides a signal to a wireless transmitter 140. The LSI processor may be implemented through large-scale integration, very large scale integration, and/or ultra large-scale integration technologies. Various encryption techniques may be employed including the Data Encryption Standard. The card may allow encryption keys to be changed regularly—perhaps through software control using a USB interface. The card is preferably always in a sleep mode unless activated to an active mode by a user's biometric on or in readable proximity to the biometric sensor. Alternatively, the card may have an ON/OFF switch.

It is further contemplated that the present invention may be employed with mechanical systems, such as individual mechanical locks. For example, a combination lock may be enabled with a receiver which is capable of receiving a signal transmitted by the transaction authentication card. The user of the transaction authentication card may input their biometric feature, the card authenticates the feature and then transmits the appropriate signal. Upon receipt of the signal by the receiver on the combination lock, the mechanical lock is released and the user may open the lock.

A power source 105, shown in FIG. 2, is preferably a flat battery which powers all the card circuitry. It is contemplated that the flat battery is a rechargeable lithium-ion battery enabled with a useful lifespan between six months to three years. In a preferred embodiment, the rechargeable battery has a useful lifespan between one to three years. It may be established that a useful lifespan of the power source 105 is determined by the number of transactions it is capable of performing during its life cycle. For example, the power source 105 may have a useful life span of one year based on the determination that the transaction authentication card may perform one to twenty transactions per day for one year. It is contemplated that the transaction authentication card's useful lifespan may be determined based on the performance of one to one thousand transactions per day for one year. It is understood that the number of transactions capable of being performed, the time period within which the performance occurs, and the duration of the ability to maintain the levels of performance established may vary significantly depending on the power source employed. It is the intention of the present invention to encompass such significant variation without departing from the scope and spirit of the present invention.

Figure 19:
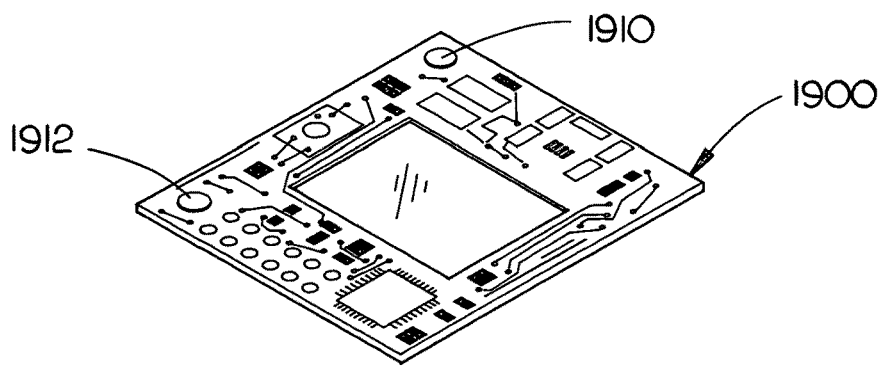
FIG. 19 illustrates an exemplary integrated circuit component feature of the transaction authentication card.
Figure 20:
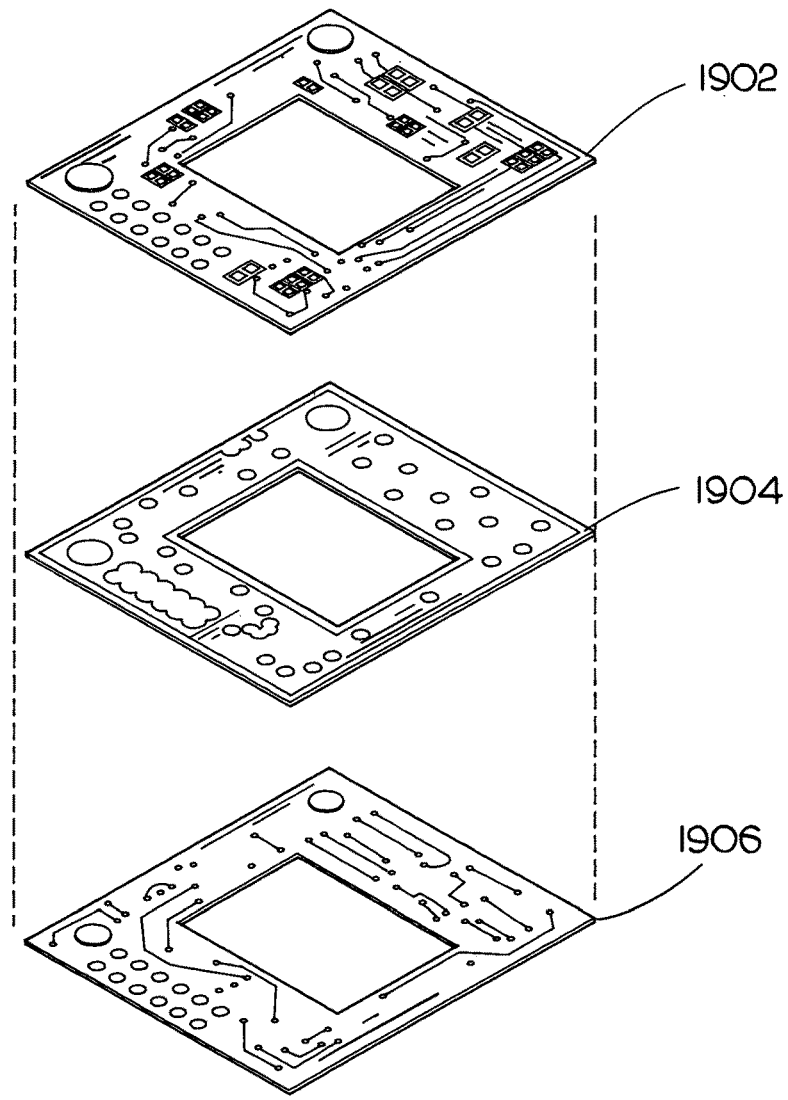
FIG. 20 is an exploded view of the integrated circuit component feature of the transaction authentication card.

In a preferred embodiment, shown in FIGS. 19 and 20, an exemplary circuit board 1900 is configured to employ a first coin cell battery 1910 and a second coin cell battery 1912 as the power source for the transaction authentication card. The first and second coin cell batteries are preferably established in correspondence with the requirements of the circuitry employed with the transaction authentication card. In the current embodiment the first and second coin cell batteries are 4.2 Volt (4.2V) coin cell batteries. These "coin" batteries may be rechargeable by a user in order to extend the useful lifespan of the batteries. It is understood that the configuration of the coin cell battery may vary. It is contemplated that further alternative power sources may be employed with the present invention. For instance, nickel-cadmium batteries, nickelmetal hydride batteries, zinc-air batteries, zinc-mercury oxide batteries, silver-zinc batteries, metal-chloride batteries, and the like. Alternative technologies, such as solar cell technology may be employed to provide power to the present invention. Alternatively, fuel cell technology and other battery systems as contemplated by those of ordinary skill in the art may be employed without departing from the scope and spirit of the present invention.

The circuit board 1900 is constructed of multiple layers 1902, 1904, and 1906. It is understood that the number and configuration of the various layers may vary to accommodate the needs of the manufacturer and/or consumers. For example, the circuit board 1900 may be constructed with four or more layers including various functional component features and interconnect assemblies. With the coin cell batteries, the power supply may preferably enable ten transactions per day for a period of one year. It is understood that the coin cell batteries and/or the lithium ion batteries may supply power for longer or shorter periods of time depending on usage of the transaction authentication card. For example, if only five transactions per day occur then the batteries may be enabled to provide power for a period longer than one year. In the alternative, if fifteen transactions per day occur then the batteries may have a limited useful lifespan of less than one year.

In further alternative embodiments, the power source employed with the present invention may be at least partially determined by the aesthetic configuration of the transaction authentication card. For instance, the desired height of the transaction authentication card may be established as substantially similar to that of a standard credit card. In order to conform with this size limitation the power source technology employed may be limited. For instance, a standard 9V battery may provide a suitable power source, but may not be suitable for keeping the transaction authentication card profile in general accordance with the appearance of a credit card, as may be desired for the present invention. The coin cell batteries, described above, and other alternative power sources may be preferably employed to maintain a desired aesthetic configuration for the transaction authentication card.

On the card is a memory 115. Optionally, the card may have audio 125, a visual indicator 135, and/or a keypad 130. Each card has an RF ID number as configured by the manufacturer as a default. The RF ID may be active or passive. There are at least two types of transaction authentication cards of the present invention: a PCMCIA interface card and a completely enclosed factory default card for radio frequency transmission. The transaction authentication card serial ID may be encrypted at the point of manufacture. The transaction authentication card may transmit an encrypted radio frequency signal with encrypted data.

Figure 3:
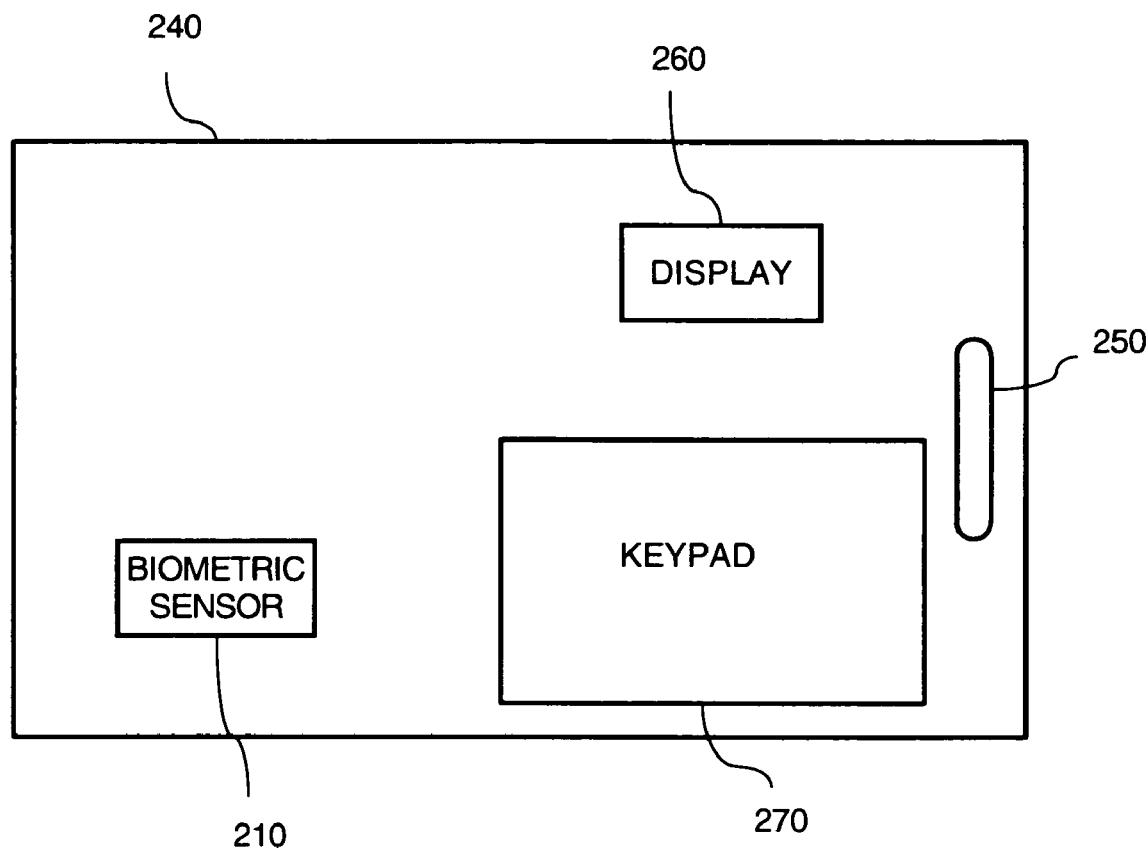
FIG. 3 illustrates a frontal view of an exemplary embodiment of a transaction authentication card according to the present invention.

The transaction authentication card may have a ridged form factor for the PCMCIA interface. The transaction authentication card may store biometric data for one to one verification. The transaction authentication card may store data in multiple configurations. The transaction authentication card may have the ability to store biometrics with the use of a computer. The transaction authentication card may store user biometrics. The transaction authentication card may allow for more than one biometric for verification FIG. 3 illustrates a frontal view of an exemplary embodiment of the transaction authentication card. On the front side of the card 240, a biometric sensor 210 is placed. A cover may be included upon the transaction authentication card to operationally protect the biometric sensor from the accumulation of dust, debris, and various environmental factors. The cover may be variously configured to be engaged by the user in numerous manners, such as a slidable cover, a rotatable cover, and the like. Alternatively or additionally, the transaction authentication card may be placed in a protective jacket. A display 260 is also provided. The display may be a single tristate LED, a liquid crystal display (LCD), or a more elaborate optical lighting arrangement. When the card is equipped with non-volatile memory, an on/off switch may be provided.

Figure 21:
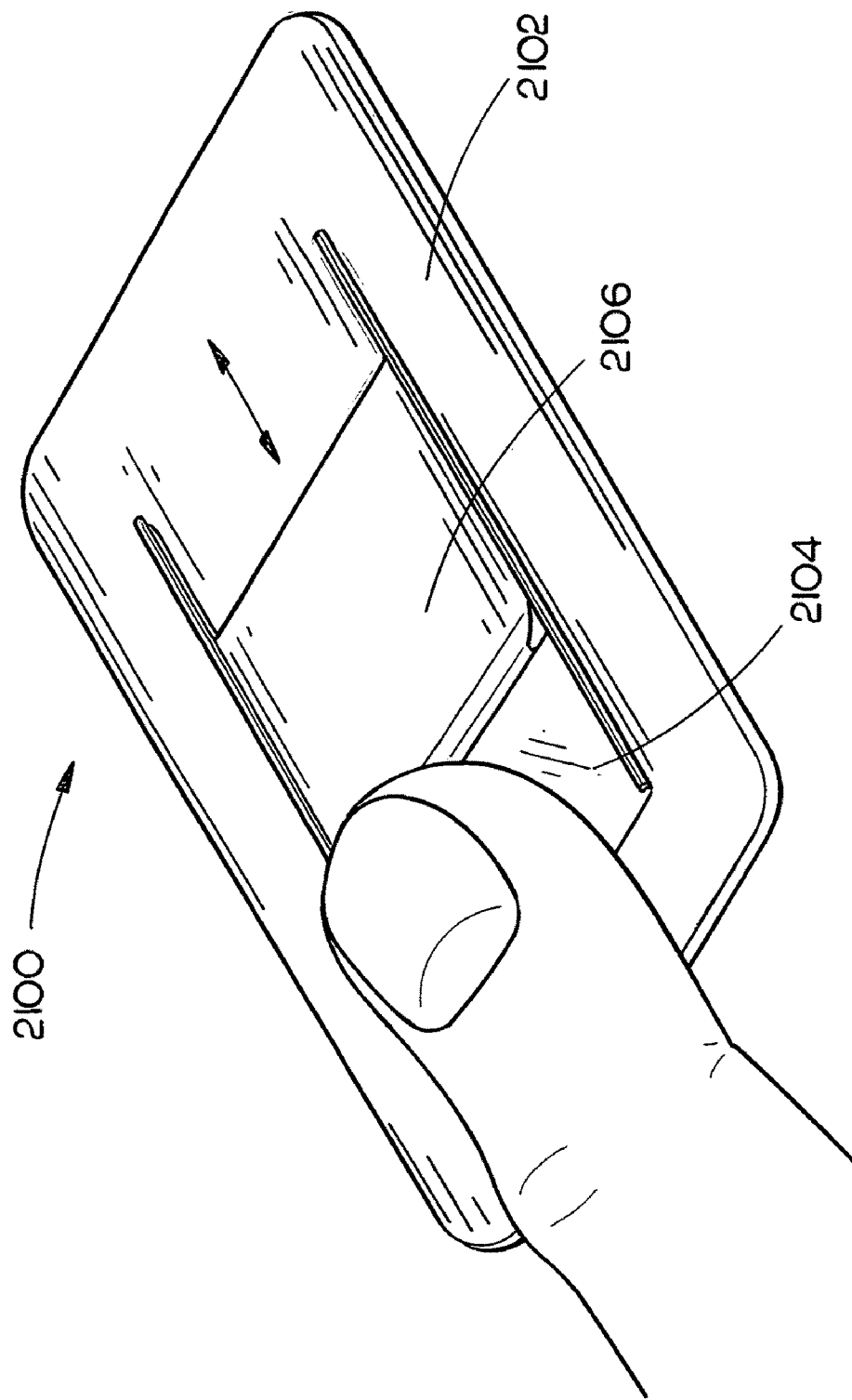
FIG. 21 illustrates an exemplary transaction authentication card including a cover configured to provide a protective barrier for a biometric sensor.

A transaction authentication card 2100, is shown in FIG. 21. Card 2100 comprises a body 2102 disposed with a biometric sensor 2104 that is engaged by a cover 2106. The cover 2106 establishes a protective barrier against adverse environmental influences, such as the accumulation of dust as previously mentioned and impact damage, damage caused by moisture contact, and the like. In the current embodiment, the cover 2106 is slidable to allow the user access to the biometric sensor 2104. The cover 2106 may further provide an activation mechanism. The activation mechanism enabling the activation of the transaction authentication card 2100 based on user interaction with the cover 2106. For instance, the activation mechanism of the cover 2106 may activate the transaction authentication card 2100, including the biometric sensor 2104, upon a user contacting the cover 2106. Contact may include the user sliding the cover to expose the biometric sensor 2104. Activation may occur at many stages. For example, activation may occur at an initial point in the sliding of the cover 2106 to expose the biometric sensor 2104 or after the cover 2106 has reached a position where the biometric sensor 2104 is fully exposed.

It is further contemplated that a biometric port may be established on the transaction authentication card. In a preferred embodiment, the biometric port may be established under or protected by a cover, similar to the cover 2106 shown in FIG. 21, which protects the biometric sensor. The location of the biometric port may vary as contemplated by those of ordinary skill in the art. In a preferred embodiment, the biometric port is established as a receiver with a contact panel. The receiver may be an aperture through which a pin may be inserted. The contact panel may be a pressure plate which is contacted by the pin through the receiver. The contact panel may be operationally connected with the processor and/or memory of the transaction authentication card. By operationally connected, what is meant is that when a sufficient amount of force is exerted upon the pressure plate it may complete an electrical circuit which connects the pressure plate with the processor and/or memory. In operation, the biometric port enables a user to selectively determine the biometric configuration of the transaction authentication card. For instance, when the pin is engaged through the receiver against the pressure plate and the electrical circuit is completed, the biometric settings established to that point, may be cleared or erased. Thus, the transaction authentication card of the present invention may be enabled to be re-used multiple times by simply clearing or erasing old biometric data and establishing new biometric data as has been and will be further described throughout the instant specification.

Alternatively, the functional capabilities established by the biometric port may be enabled in various manners. For instance a security device may be included with the transaction authentication card to assist in the prevention of identity theft and fraud. In a preferred embodiment, the security device may be a light sensitive assembly integrated into the circuitry of the present invention and enclosed within the body of the transaction authentication card. The light sensitive assembly may clear or erase all information, including all biometric information, stored in the memory of the transaction authentication card if the body of the transaction authentication card is opened, thereby, exposing the light sensitive assembly to light. In a preferred embodiment, the light sensitive assembly is a light sensitive diode integrated within the circuitry of the transaction authentication card. It is understood that alternative light sensitive technologies may be employed without departing from the scope and spirit of the present invention.

It is contemplated that the security device may terminate the transaction authentication card as a useful device. Thus, when the body of the transaction authentication card is opened, exposing the light sensitive assembly to light and erasing all information stored on the transaction authentication card, the transaction authentication card may not be able to be re-initialized with new biometric information. Alternatively, the security device may be enabled to allow the transaction authentication card to be re-initialized and continue its useful lifespan. For example, the erasure of the information stored in transaction authentication card may be a partial erasure. A user determined encryption setting, such as a password, may be left stored in the memory and if re-entered may enable the transaction authentication card to accept new biometric information. After the new biometric data is entered the transaction authentication card may resume its operational capabilities.

Figure 23:
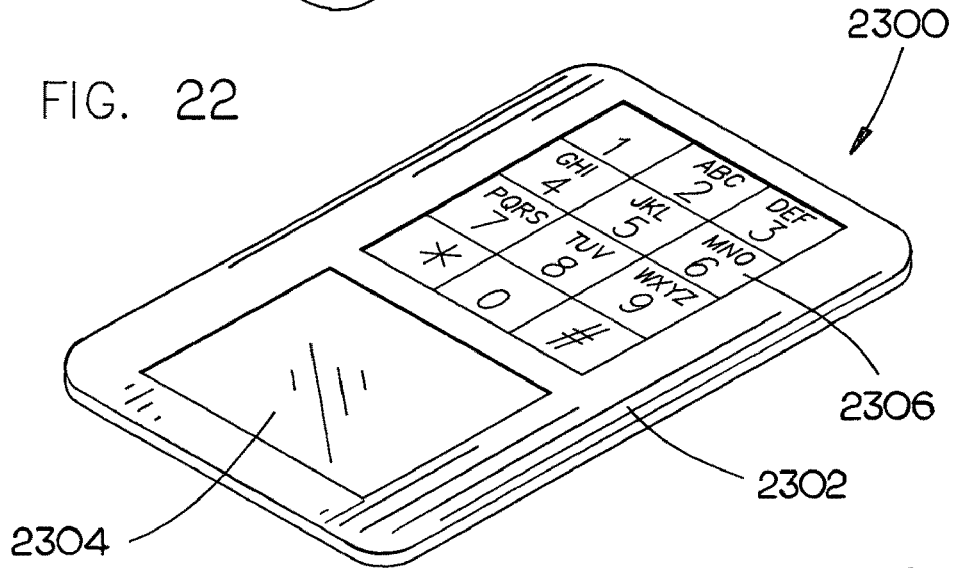
FIG. 23 illustrates an exemplary transaction authentication card including a selector configured as an alphanumeric keypad.

An optional keypad 270 is shown in FIG. 3. The keypad 130 and 270, of FIGS. 2 and 3, may enable various functional capabilities by the transaction authentication card, and may be enabled in various configurations. Additionally, the transaction authentication card may enable the keypad as a selector and may enable various configurations of the selector. In a preferred embodiment shown in FIG. 23, the selector is enabled as an alphanumeric keypad 2306 capable of enabling the user of the transaction authentication card with the ability to selectively determine the operation (functional mode) of the transaction authentication card. Thus, the transaction authentication card may provide the user the ability to accomplish a variety of transactions on different accounts which the user maintains and have been enabled to be accessed by the use of the transaction authentication card. It is understood that the determined operational status (mode), enabled by the selector, may further determine the type of signal transmitted or transaction performed, as described throughout the instant specification, by the transaction authentication card of the present invention.

In the field of financial transactions, for example, the selector may enable a user to select between establishing the transaction authentication card to function as a credit card or a debit card. In this exemplary example, the selector may be a switch, such as a two position switch which enables the user to select between the functional modes identified above, providing multiple functional capabilities to the user of the transaction authentication card. It is contemplated that an identifier may be included to provide an indicator to the user of which mode the transaction authentication card has been established in based on the engagement of the selector. The identifier may include a visually ascertainable indicator from which the user may determine the operational status of the transaction authentication card. Various alternative configurations of the identifier may be employed without departing from the scope and spirit of the present invention.

The keypad and/or the selector may be integral with the body of the transaction authentication card. This integration may accommodate various configurations of the body of the transaction authentication card. Further, the integration may contribute to a desired aesthetic appearance for the transaction authentication card. These and other concerns as contemplated by those of ordinary skill in the art may be addressed by the integration of the selector with the body of the transaction authentication card.

Figure 22:
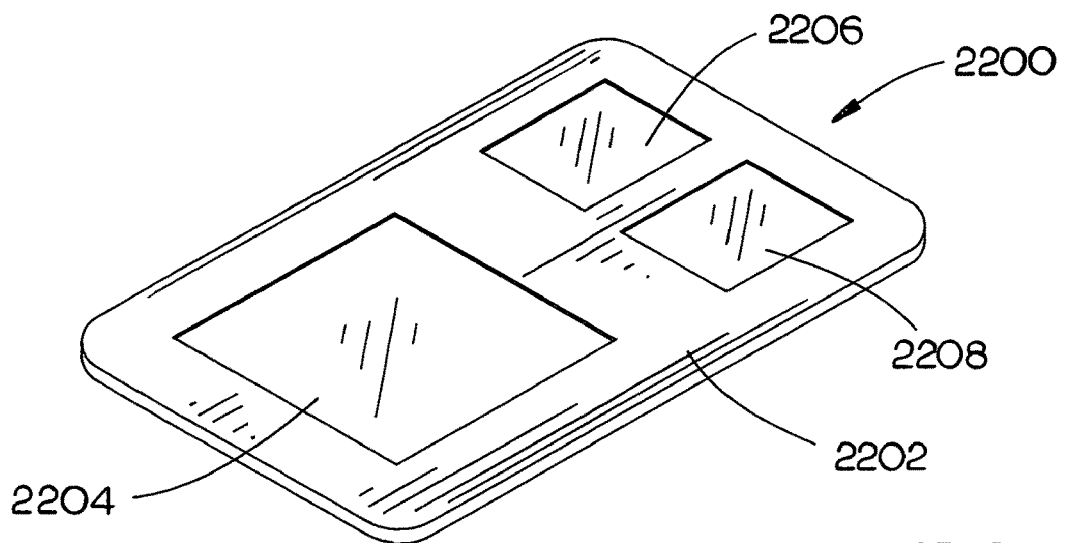
FIG. 22 illustrates an exemplary transaction authentication card including a first selector.

In an alternative embodiment, a transaction authentication card 2200, shown in FIG. 22, comprises a body 2202 including a biometric sensor 2204 and a selector comprising a first button 2206 and a second button 2208. In the current embodiment, the first button 2206 and the second button 2208 provide the user the ability to establish the transaction authentication card 2200 between a first credit card functional mode and a second credit card functional mode. The first button 2206 may include a first identifier (e.g., logo) for the first credit card functional mode and the second button 2208 may include a second identifier for the second credit card functional mode. It is understood that the first and second buttons may provide the user with the ability to enable the transaction authentication card 2200 in a variety of functional modes. For instance, the first and second buttons may enable the transaction authentication card 2200 in the functional mode of a debit card, telephone card, and the like. The buttons provide an electrical connection with the circuit board within the body 2202 which determines the functional mode of the transaction authentication card 2200.

The transaction authentication card may further be enabled with two or more selectors established within the body. Each selector may provide separate functionality to the user. For example, a first selector may enable the user to determine an operational status or primary mode of operation of the transaction authentication card from among various choices. The first selector may enable selection between establishing the transaction authentication card in a financial transactions mode, a calling card mode, and an ingress/egress mode. It is understood that the transaction authentication card may be enabled to be established in various other primary modes as contemplated by those of ordinary skill in the art. After the first selector has established the transaction authentication card in a desired primary mode, a second selector may enable the user to determine a particular sub-mode of the primary mode. For instance, if the calling card mode is established as the primary mode, the second selector may enable the user to select between various types of calling cards identified as being selectable within the sub-mode. It is understood that the functional relationships established in and among the various selector embodiments, i.e., two or more selectors, may be varied to accommodate the needs of consumers and or manufacturers of the transaction authentication card of the present invention.

Alternatively, the first and second selectors may include a "no-mode" capability. The "no-mode" capability enables the user to establish the transaction authentication card with no functional capabilities. This may be enabled through each selector having two position capabilities. The first position may be a no-mode position and the second position may be a functional mode position. For instance, using the buttons, either the first or second button may be in the no-mode position when it is fully extended. The user may be required to depress the button into the functional mode position, which may include enabling the button with a mechanical fastening system to hold the position of the button in place. Other systems contemplated by those of ordinary skill in the art, may be employed.

Figure 24:
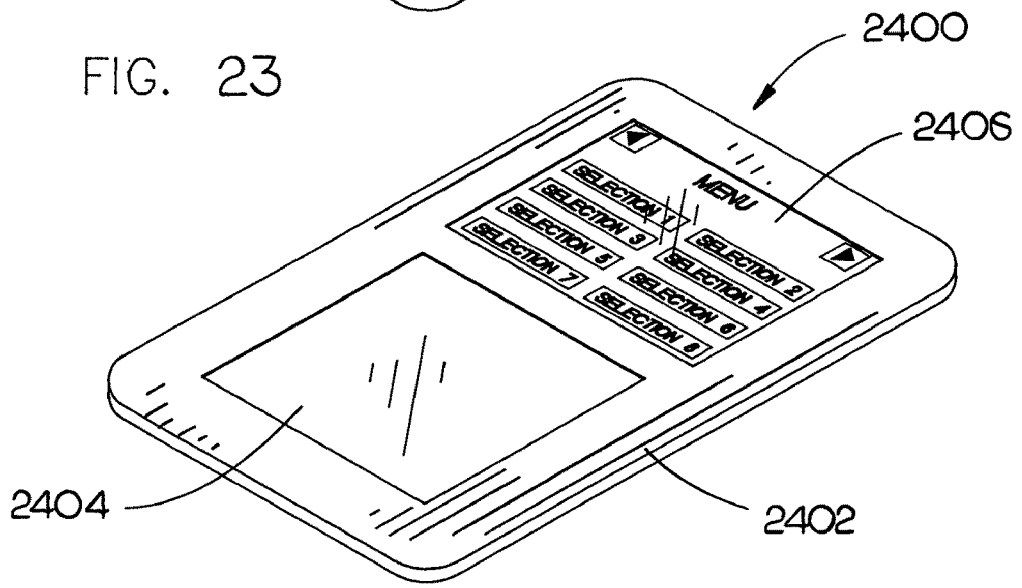
FIG. 24 illustrates an exemplary transaction authentication card including a selector configured as a touch screen.

A transaction authentication card 2400, shown in FIG. 24, comprises a body 2402 including a biometric sensor 2404, and a selector enabled as a touch screen 2406. The touch screen 2406 may be engaged by the user, such as by contacting a finger of the user with the touch screen 2406, in order to enable the user to select the operational status of the transaction authentication card 2400. It is understood that the touch screen 2406 may enable similar functional modes for the transaction authentication card 2400, as described above. The touch screen 2406 may be configured in a variety of ways. For example, the touch screen 2406 may be established as a generally rectangular area within the body 2402 of the transaction authentication card 2400. The touch screen 2406 may occupy the area shown and defined in FIG. 3 by the keypad 270 or may occupy more or less space upon the body 2402 of the transaction authentication card 2400.

Figure 25:
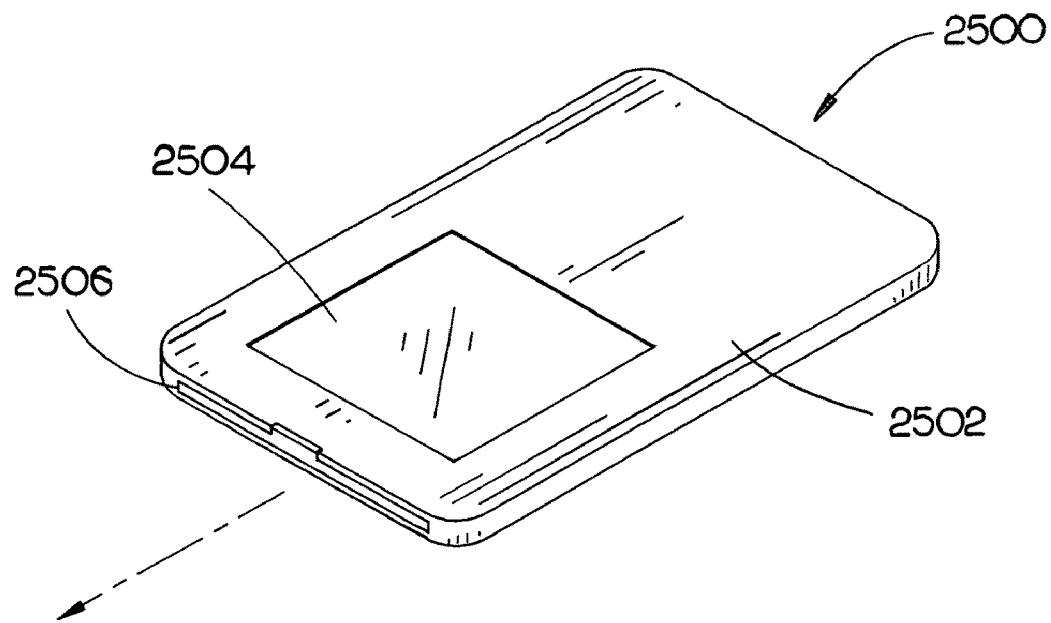
FIG. 25 illustrates a first exemplary quick access transaction authentication card including a first wedge assembly.
Figure 26:
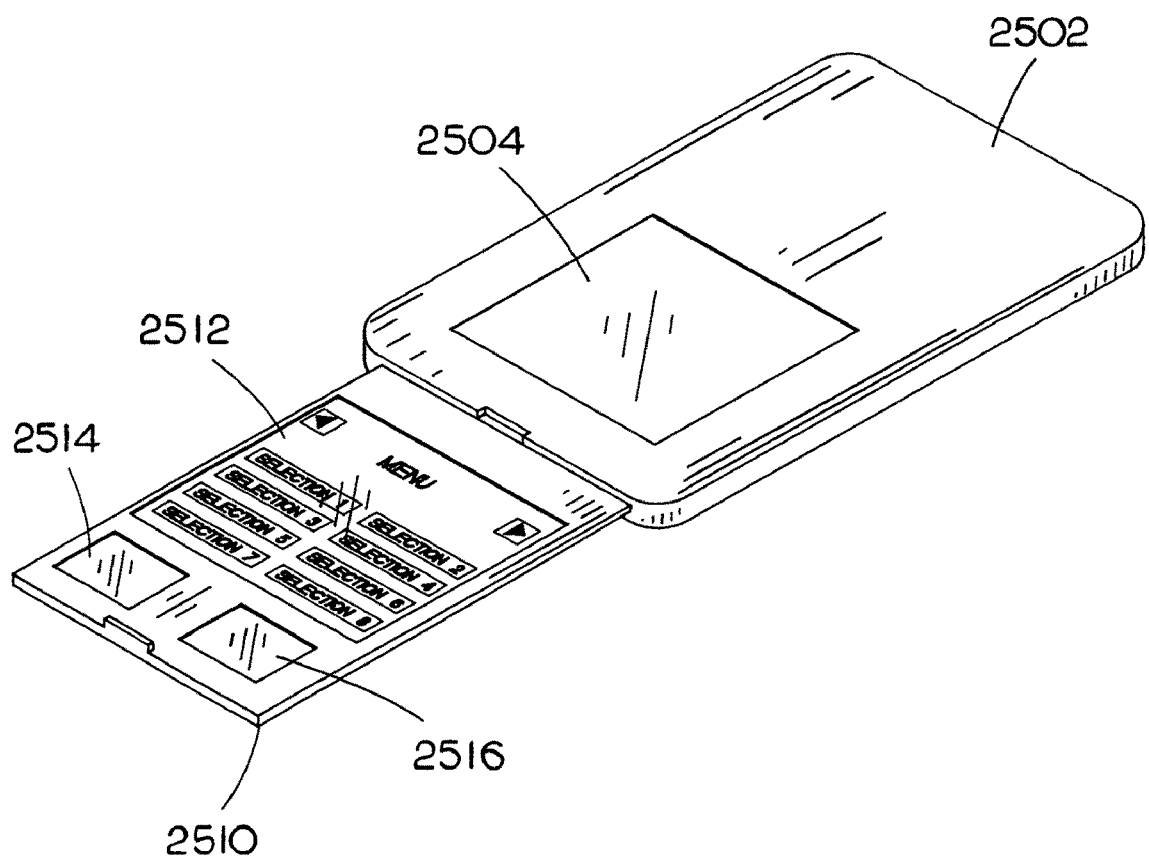
FIG. 26 illustrates the first wedge assembly extending a first wedge from a body of the first quick access transaction authentication card.

Alternatively, the selector may establish the transaction authentication card as a quick access transaction authentication card, with the selector as an extendable feature from the body of the transaction authentication card. Referring now to FIGS. 25 and 26, a first quick access transaction authentication card 2500 comprises a body 2502 including a biometric sensor 2504, and a first wedge assembly 2506. The first wedge assembly 2506 includes a mechanism for enabling the extension from and retraction into the body 2502 of a first wedge 2510. In the current embodiment, the first wedge 2510 provides a selector including a touch screen 2512, a first button 2514 and a second button 2516. The first wedge 2510 may be mechanically connected with a spring loaded mechanism disposed within the body 2502. The first wedge 2510 may insert and extend from a slot established in the body 2502 of the transaction authentication card 2500. It is contemplated that the first wedge 2510 may be variously configured and may provide a variety of functional capabilities, such as those previously described.

Figure 27:
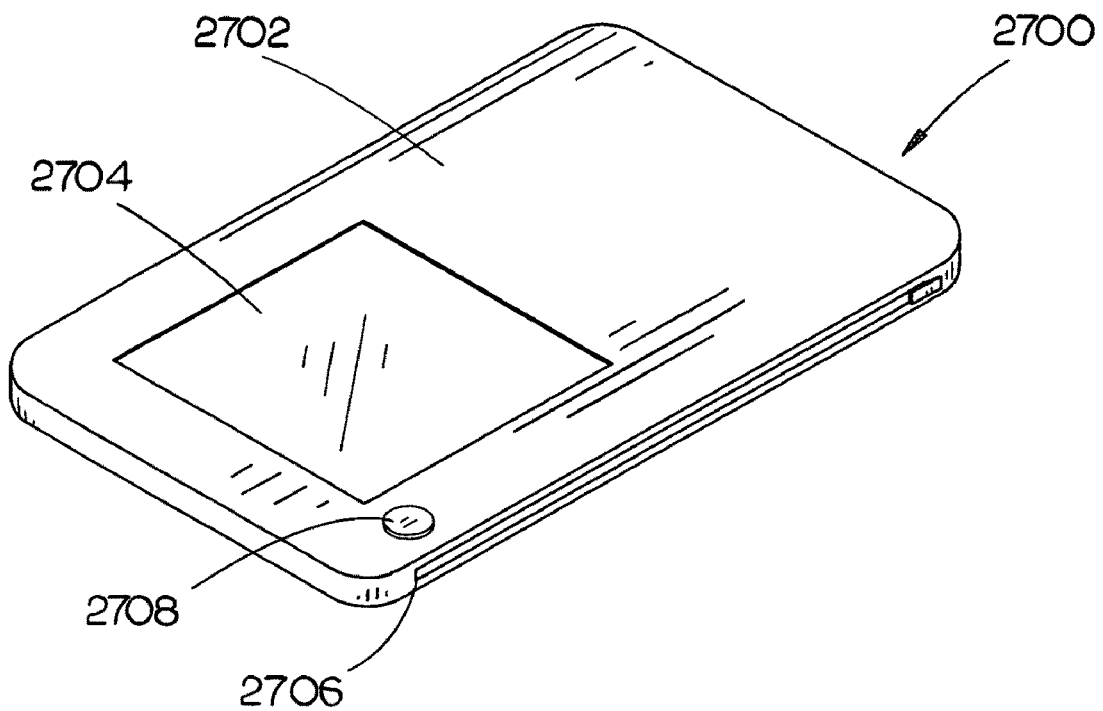
FIG. 27 illustrates a second exemplary quick access transaction authentication card including a second wedge assembly.
Figure 28:
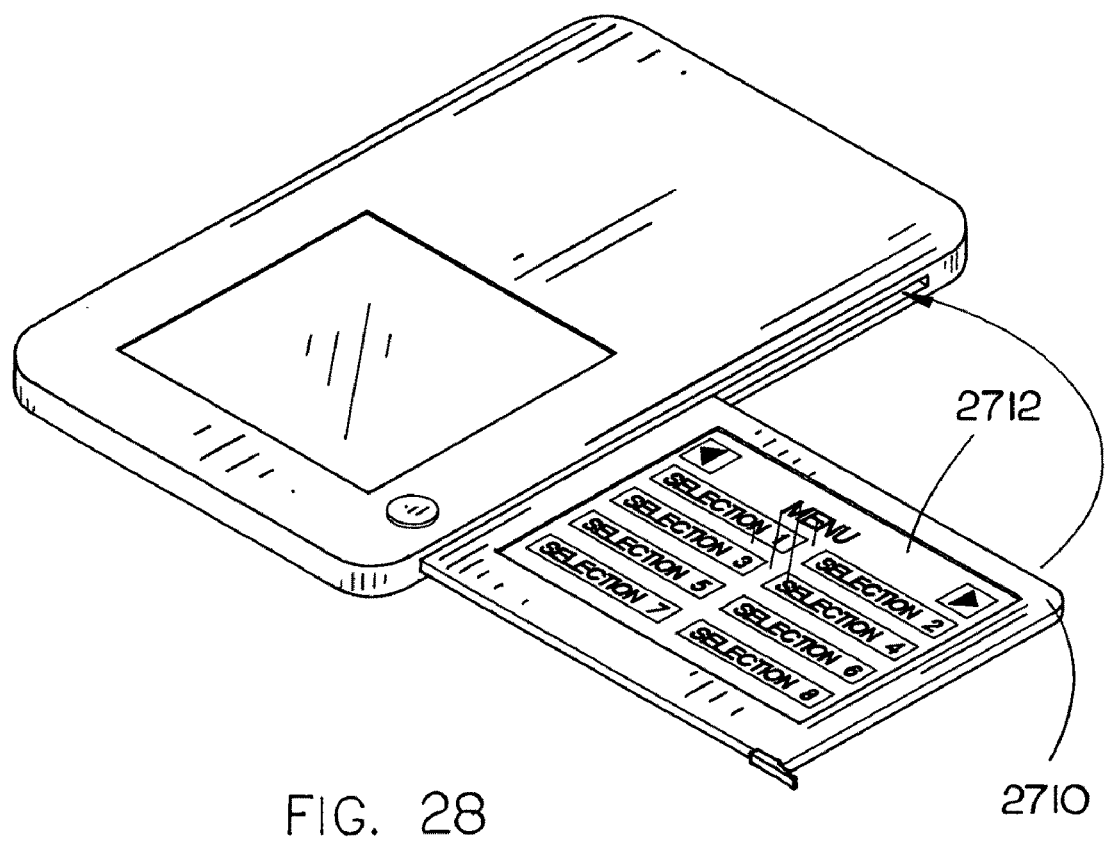
FIG. 28 illustrates the second wedge assembly rotatably extending a second wedge from a body of the second quick access transaction authentication card.

In an alternative exemplary embodiment of a quick access transaction authentication card, a second quick access transaction authentication card 2700, is shown in FIGS. 27 and 28. A body 2702 includes a biometric sensor 2704 and a second wedge assembly 2706. The second wedge assembly 2706 further includes a switch 2708 and a second wedge 2710. The second wedge 2710 includes a selector which is a touch screen 2712. In the current embodiment, the switch 2708 is a mechanical connector which couples with the body 2702 and the second wedge 2710. The switch 2708 provides a user of the transaction authentication card 2700 the ability to access the second wedge 2710. For example, a user may depress switch 2708, when the second wedge 2710 of the transaction authentication card 2700 is in a first position as shown in FIG. 27. The depressing of the switch 2708 allows the second wedge 2710 to rotate out from the body 2702 into a second position and allow a user to access the various functional capabilities provided by the touch screen 2712. It is understood that the second wedge 2710 may be rotated back into the first position by the user, thereby, re-establishing the transaction authentication card 2700 into a preferred configuration. It is contemplated that the second wedge 2710 may be variously configured and may provide a variety of functional capabilities, such as those previously described.

In an alternative embodiment, the selector may be a fold-out selector which may enable the selector to "open" from the body of the transaction authentication card in order to provide its functionality and then be "closed". The closed position may enable the user to retract the selector, thereby, substantially encompassing the selector within the body of the transaction authentication card. In a still further alternative embodiment, the selector may be enabled as a roll-out selector. The roll-out capability may enable the selector to extend away from the body of the transaction authentication card during use and then be retracted within the body of the transaction authentication card when not being used. A tab or other member piece may be attached to the roll-out selector for engagement by the user when the roll-out selector is in the retracted position. The roll-out selector may be established using a flexible screen technology, commonly known as organic light emitting diode (OLED). This flexible screen technology may increase the brightness of the screen and use less current from the power source thereby, assisting in maximizing the life span of the power source for the transaction authentication card.

It is further contemplated that the selector may be enabled as a modular device, capable of being removed from the body of the transaction authentication card. The modular selector may be variously configured with one or more switches, buttons, and the like. The modular selector may further enable the use of secondary selector assemblies by the user. For example, a first modular selector, enabled as a two position switch, may be coupled with the transaction authentication card. The user may decide they prefer to have buttons to depress for determining the functionality of the card. A second modular selector, enabled with buttons may be selected by the user. The user may then remove the first modular selector and insert the second modular selector. It is understood that the transaction authentication card includes the functional capability to enable the removal and insertion of various modular selector assemblies. This functional capability may be enabled in various ways as contemplated by those of skill in the art.

In a still further embodiment, the selector provided by the transaction authentication card may be enabled as a scrolling member. The scrolling member may be a generally circular member pivotally connected with the body of the transaction authentication card. The location of the connection of the scrolling member may vary. In a preferred embodiment, the scrolling member may be located in a corner of the body of the transaction authentication card. A user may rotate the scrolling member which through a communicative and/or mechanical coupling with the processor of the transaction authentication card may enable the user selectable functionality, as previously described for the selector.

It is understood that the selector may provide various alternative capabilities to the transaction authentication card, such as entering personal identification information, in addition to the biometric data gathered. It is contemplated that the alphanumeric, modular, touchscreen, quick access, button, and scrolling member embodiments of the present invention, may operate in conjunction with the display 135 and 260, of FIGS. 2 and 3 described above, and display 710 and 750 which will be described below, which may be provided by the transaction authentication card. Thus, the transaction authentication card may be enabled to provide various selectable options. In a preferred embodiment, the options may be displayed on the display 710 and 750 in a menu format which may be accessed and selected from by the user engaging with one of the various embodiments of the selector or the keypad.

Figure 4:
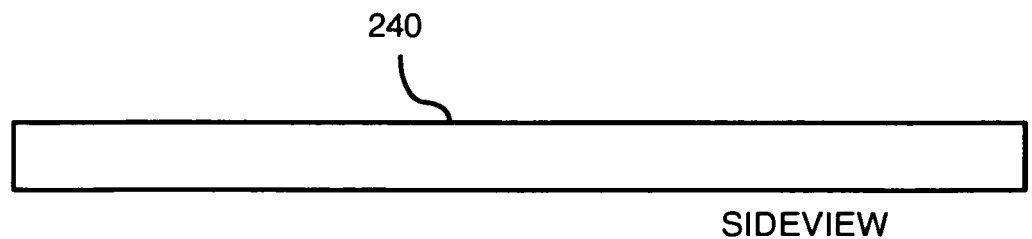
FIG. 4 illustrates a side view of the transaction authentication card in an embodiment of the present invention.

FIG. 4 shows a preferred embodiment of the transaction authentication card 240 in which the height of the card remains uniform throughout the length of the card. The transaction authentication card may be manufactured in many different form factors. The card is approximately the size of a Personal Computer Memory Card International Association (PCMCIA) card and may be an inch or so longer. Preferably, the transaction authentication card has a uniform cross section and slim, uniform profile, and measures less than 4×6 inches and has a height of less than ½ inch. In one embodiment, the card measures 3⅜×2⅛×3/16 inches. The backside 240 may be of a protective material with no visual indicia, may have a photo ID printed on it, or may have a processed reserved area to permit such to be printed. The photo ID or other image may be printed on the front side or the back side of the card. A perforation or hole 250 in the body of the card may allow for attachment via a chain or strap. The body may be built with impact plastics and/or metal and/or may be rigid or pliable. A rigid body is preferred. Reinforcing ribs may be added on the inner surfaces of the front and back of the card body to provide greater strength.

Figure 5:
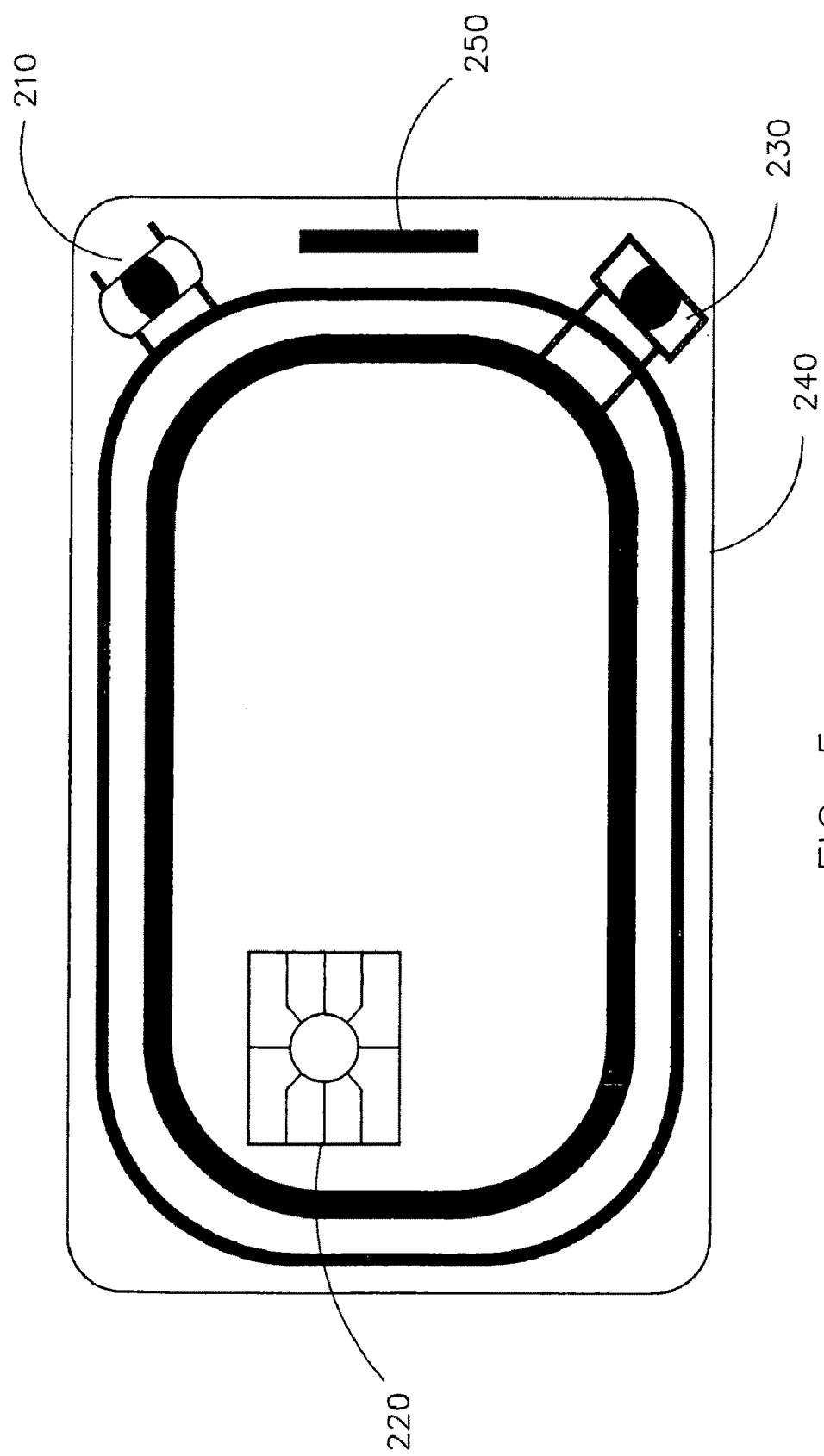
FIG. 5 illustrates a cutaway view of an embodiment of the present invention.
Figure 6:
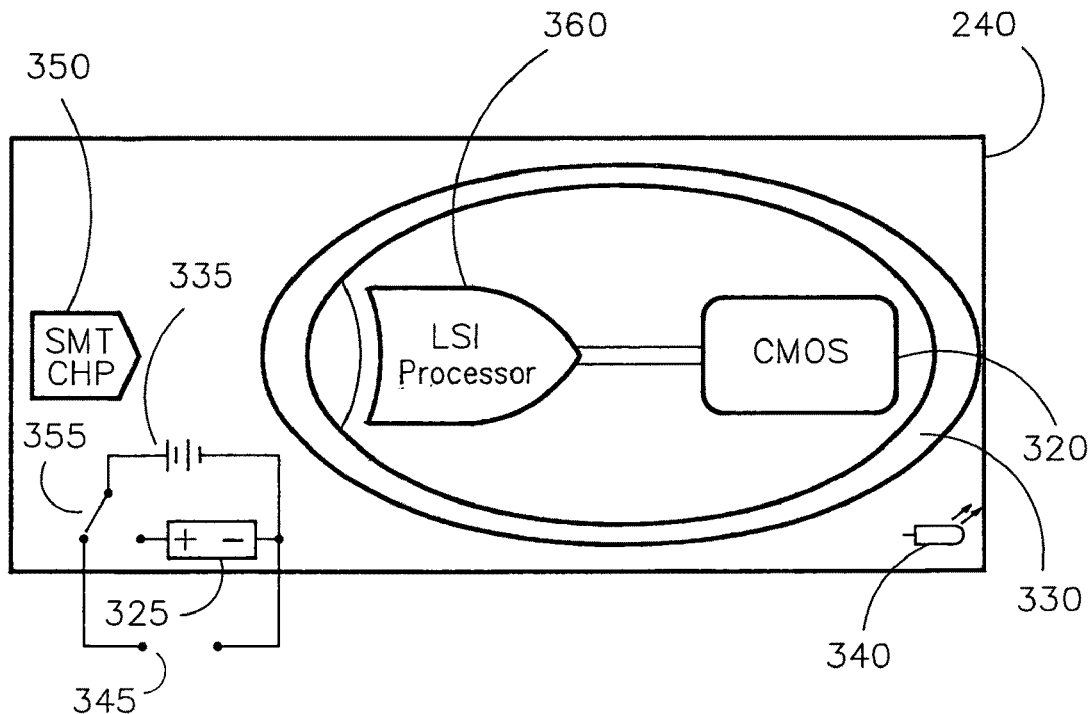
FIG. 6 illustrates a cutaway view of an embodiment of the present invention in which a solar cell is used.
Figure 7:
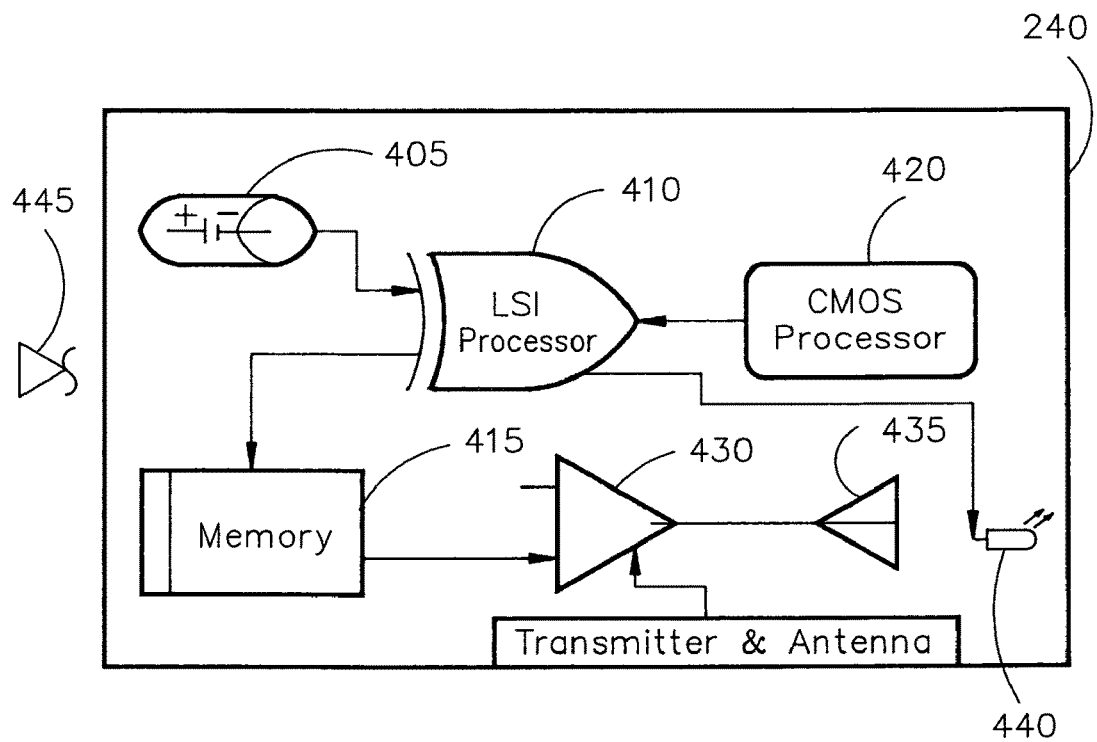
FIG. 7 illustrates an exemplary embodiment of a circuit block diagram of the present invention.

FIGS. 5-7 show cutaway views of various embodiments of the transaction authentication card. In FIG. 5, an RF transmitter 210 is electrically connected to a loop antenna and a biometric sensor 230 is connected to conductive traces or wires that lead to processing circuitry 220. The biometric sensor may have a lid or cover to prevent dust buildup and to protect the sensor when not in use. The biometric sensor 230 is preferably a fingerprint sensor of either the capacitive or scanning type. If used, the capacitive type sensor may be either an active capacitive pixel sensing sensor or a passive capacitive sensor. The active capacitive sensor offers a higher signal-to-noise ratio and greater resolution; the passive capacitive sensor is lower cost than the active capacitive sensor. In one embodiment, the Verifinger Touch Chip sensor is used as the biometric sensor 230. An optical sensor may be used as the biometric sensor.

The processing circuitry 220 interfaces the biometric sensor 230 and RF transmitter 210. When the cardholder activates the authentication, the RF signal is sent to the transaction authentication card. The RF signal may be a direct sequence signal or a frequency-hopping signal. The transaction authentication card has a radio transmitter that transmits in the range from 1 kilohertz to 999 gigahertz and may have a receiver that receives in the range of 1 kilohertz to 999 gigahertz. RF transmission may be in accordance with Bluetooth or IEEE 802.11 standards. Radio frequency transmission is only accomplished when the biometric in the on-board database is authenticated with the biometric input from the user. The effective range of the RF signal may be zero to five feet or zero to four inches or another range. The card may be implemented to emit RF signals of two or more distinct frequencies. The RF signals may be implemented such that the frequency of a first signal is between two (2) and one billion (1000000000) times the frequency of a second signal. Optionally, a switch may be added to the card to switch to one of multiple transmission frequencies. Each transmission frequency may correspond to a unique encrypter.

The wireless output data format may be application specific or may adhere to a recognized access control system standard. The transaction authentication card preferably uses a standard PCMCIA interface to allow computer terminal authentication and has a PCMCIA form factor that permits charging of the battery and terminal authentication. An additional interface will be wireless to a computer terminal that uses the protocol compliant with or identical to HID/MIFARE. The transaction authentication card preferably has a proximity antenna built into the card and will support various communications standards. The transaction authentication card interfaces through a serial (e.g., USB) port on the computer terminal. Biometric data is enrolled at the card level without the need of a CPU.

In the preferred embodiment, the transaction authentication card supports embedded contact smart chip module access control. In the preferred embodiment, multiple wireless protocols are used such as the HID and MIFARE protocols. HID Corporation, based in Irvine, Calif., provides the combining of proximity and smart card contactless technologies using Wiegand format access control data. The combined HID MIFARE protocols operate at a frequency of 13.56 (or 15.76) MHz (i.e., MIFARE) and 125 (or 129) KHz Proximity (i.e., HID). In alternative embodiments, the transaction authentication card may use solely HID or MIFARE protocols. The encrypted RF signal using MIFARE is either 26 bits or 32 bits, as selected by the manufacturer. These embodiments preferably use the Philips MIFARE S50 module having an EEPROM memory. The MIFARE read range is 2.5 to 10 cm. A HID MIFARE reader may be used with the transaction authentication card to provide secure access to a building or machine through contactless operation that does not cause wear and tear on the reader.

FIG. 6 shows an embodiment having a solar cell 325 to supply at least some of the transaction authentication card power requirements. The transaction authentication card is preferably powered by an internal battery, but may, optionally, be externally powered, such as by an adapter. The internal battery may be one or more flat batteries and may be a nominal 1.5 volt battery. A solar cell or capacitor may be used as the power source. Redundant power supplies may be used. A flat battery 335, assisted by a capacitive power cell and/or a micro solar cell 325, preferably supplies the power requirements. The flat battery may be long life and/or rechargeable through terminals 345 connectable to an external power source or recharger. Additionally, the power source (battery) employed may be rechargeable through an inductive charger system. The inductive charger system may increase the ease with which a user may recharge the power source of the transaction authentication card. As described previously, lithium-ion batteries may be used. A switch 355 may be provided to switch to a recharge mode, to switch from a solar power mode, or to switch between a solar power mode and a recharge mode. In one embodiment, when the transaction authentication card is in a terminal port such as on a personal computer or other external device, the transaction authentication card battery or batteries are recharged. Also included in the embodiment of FIG. 6 are a smart chip 350, a large-scale integration processor 360, a fingerprint sensor 320, an antenna 330, and an indicator LED 340. The data is preferably encrypted before being transmitted wirelessly. In the embodiment of FIG. 6, the processor is the brain and the smart chip is used for MIFARE, as an interface, and provides dynamic memory.

FIG. 7 shows an exemplary functional block diagram of the circuitry and housing designs in an embodiment of the present invention. The transaction authentication card includes an electrolytic battery 405, a processor 410, a fingerprint sensor 420, a memory 415, a transmitter 430, PCMCIA interface 445, and an antenna 435. Light emitting diodes (LEDs) 440 may also be used. A single multicolor LED may be used to indicate two or more states of the processing by the transaction authentication card. Although a bicolor or bistate LED may be used, a tristate LED or a set of LEDs is preferably located on the card to indicate state of enrollment, good read/biometric data, and low battery. The set of LEDs may establish individual LED functionality to work in unison and/or to provide separate capabilities. It is further contemplated that the LED or set of LEDs may be used to indicate additional states of readiness for the transaction authentication card. For example, the LED may be linked with a security device, as previously described, and provide an indicator when the transaction authentication card has been tampered with. Additionally, the LED may provide an indication of the status of the transaction authentication card. For instance, the LED may exhibit one color to indicate to the user that the transaction authentication card is in a financial transaction (primary mode) and another color to indicate that the transaction authentication card is in a ingress/egress (primary mode). It is understood that the LED may further provide different indicators to a user of various sub-modes within primary modes. For instance, when the transaction authentication card is in the financial transactions (primary mode) the LED may provide individual indication of the different sub-modes which the transaction authentication card may be established in. When a user establishes the transaction authentication card in a "credit card" mode (sub-mode) the LED may provide a first color. Alternately, when the user establishes the transaction authentication card in a "debit card" mode (sub-mode) the LED may provide a second color. The LED may be established with various capabilities, such as numerous different lighting capabilities, in order to accommodate the functionality of the transaction authentication card. Further, the LED may have a blink mode and a steady state (i.e., non-blinking) mode to enhance viewability. The light emitting bodies of the LED or LEDs may protrude completely from the body of the card, may protrude partially from the body of the card, may be nested with a depression on the card body, or may be fully contained with the card. In the nested embodiment, the body of the card may have a conical depression with an apex directed to the interior of the card. The LED, when nested on the card body or contained within the card, may be covered with a protective adhesive sheet.

Figure 8:
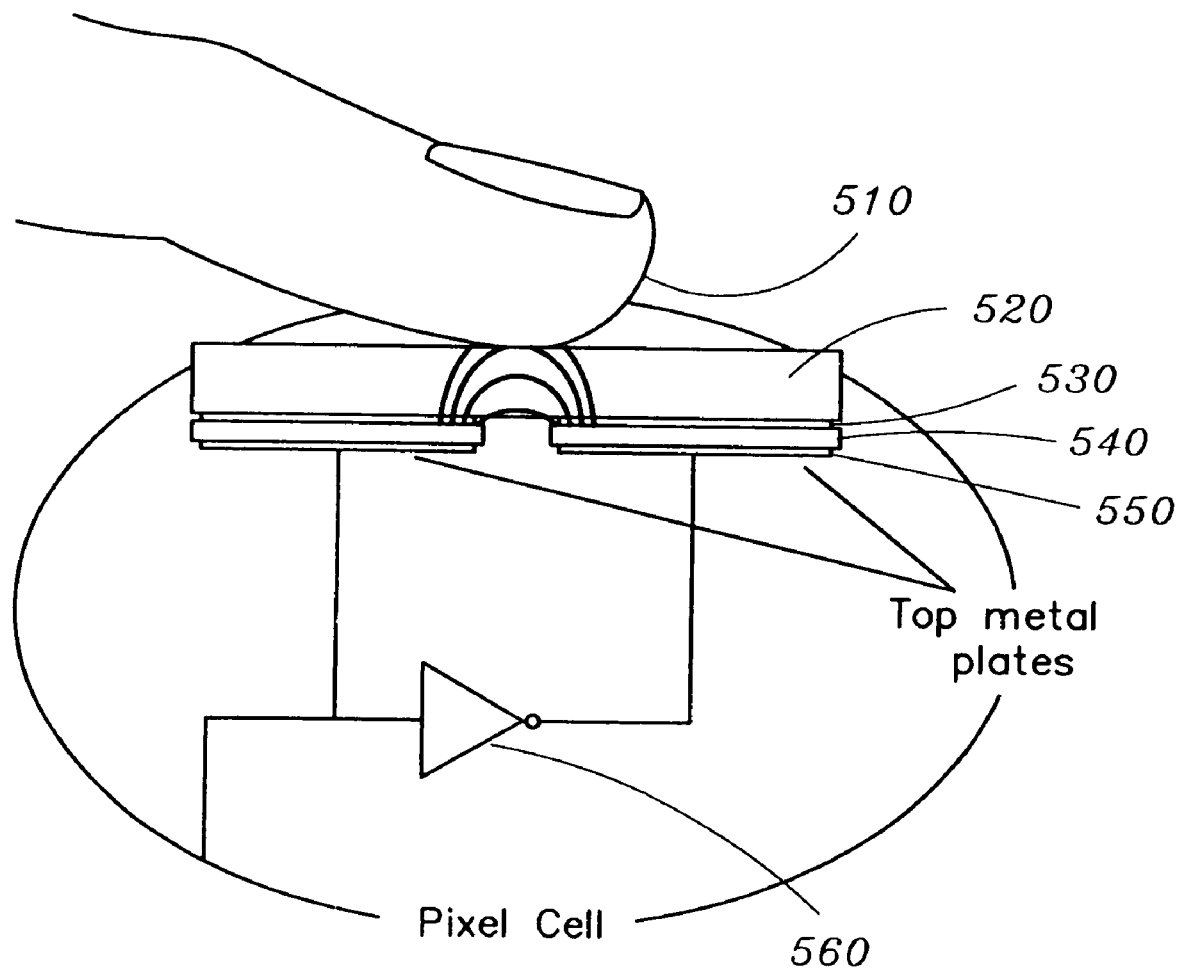
FIG. 8 illustrates operation of the biometric sensor of the present invention.
Figure 9:
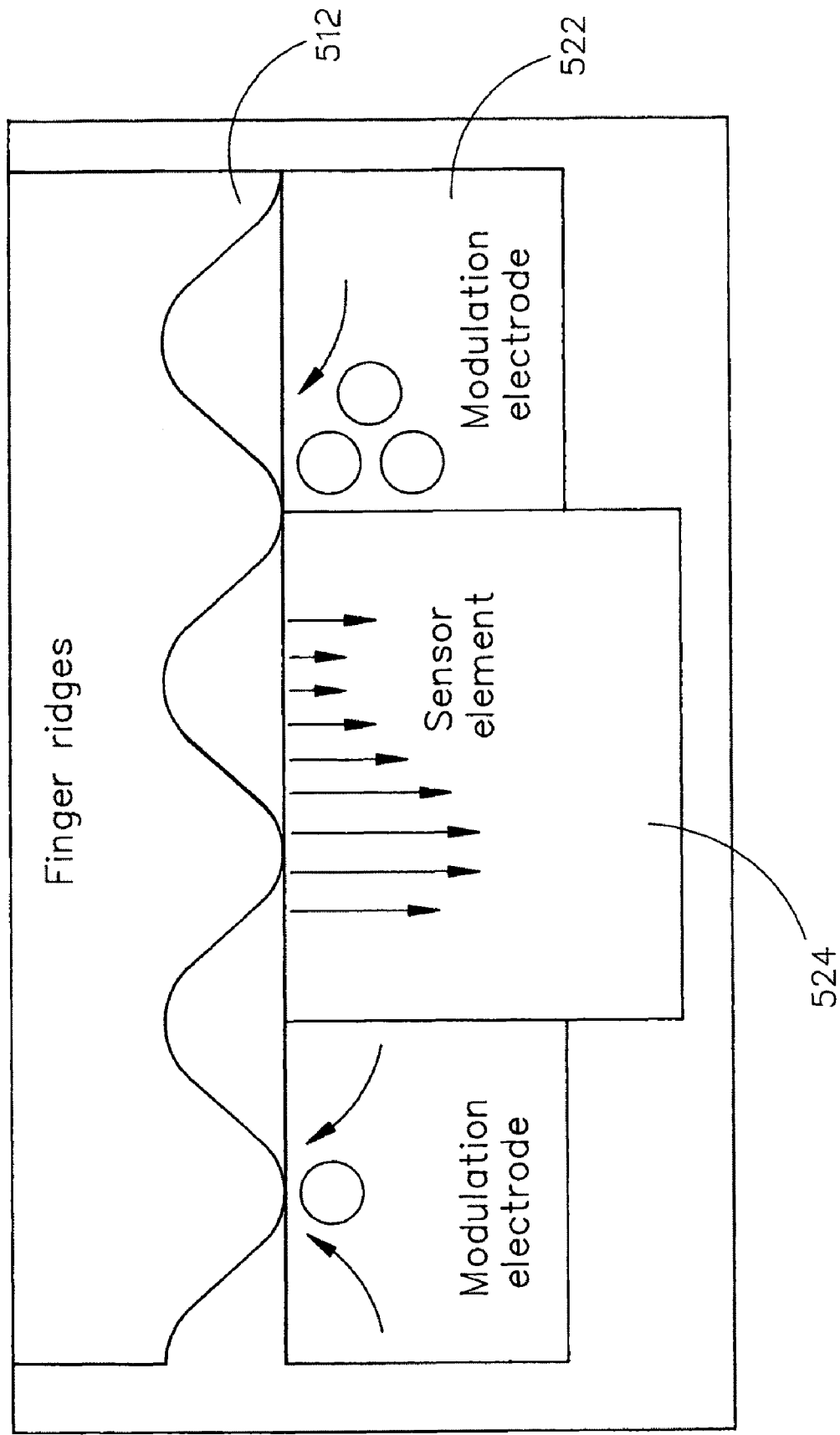
FIG. 9 illustrates a close up view of an exemplary embodiment of the biometric sensor of the present invention.
Figure 10:
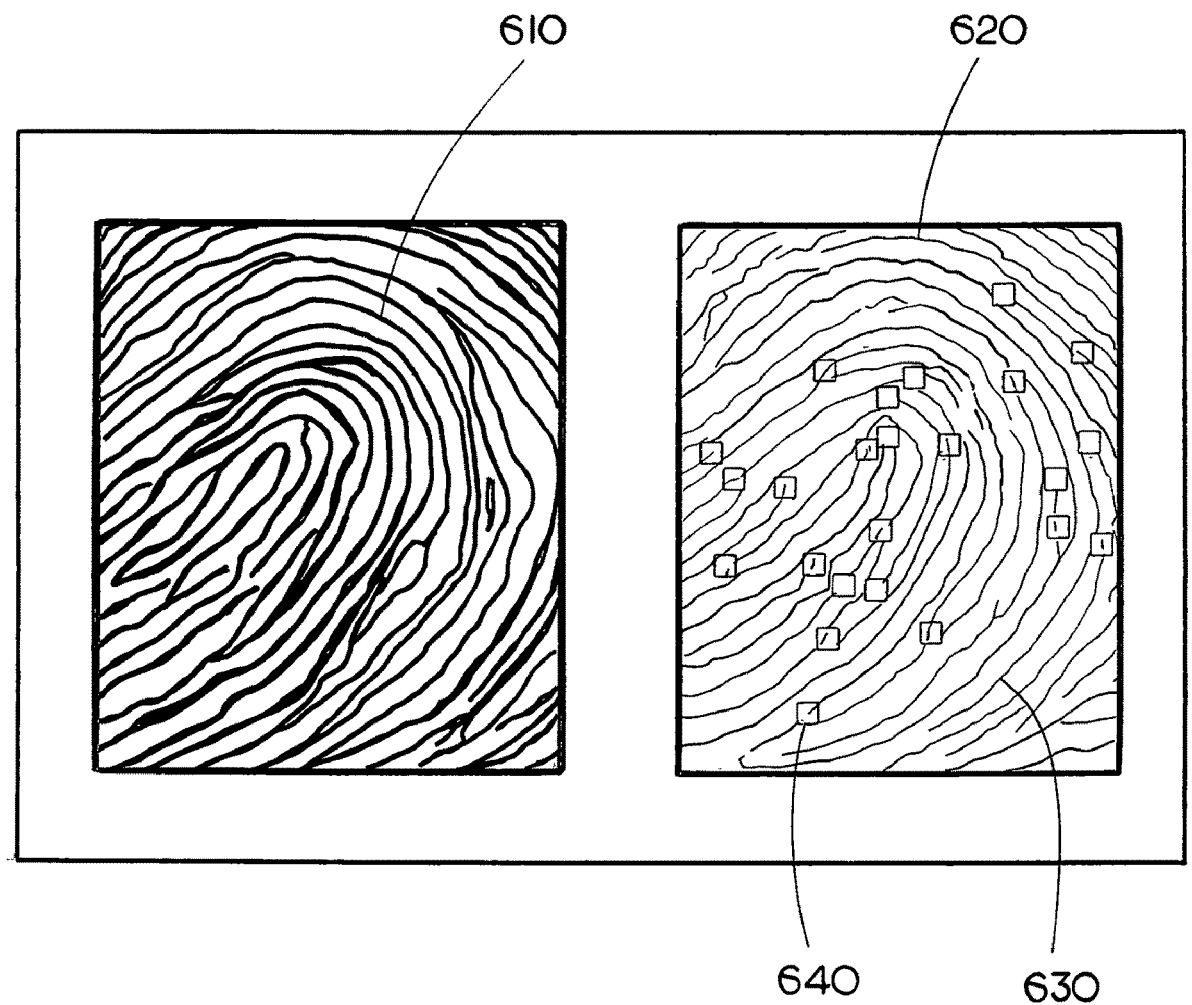
FIG. 10 illustrates fingerprint measurement or identification points used in an embodiment of the present invention.

FIGS. 8-10 illustrate an exemplary embodiment of the operation of a biometric sensor. A finger 510 contacts a dielectric material 520 and passes a charge to two top plates 530 of two capacitors (conductive layer 530, dielectric layer 540, conductive layer 550). The change in current flow in the circuitry 560 is detected and amplified. FIG. 9 shows an embodiment in which current is passed from modulation electrodes 522 through finger ridges 512 to a sensor element 524. A processing algorithm may create a data table for the fingerprint. The data table may correspond to the fingerprint ridge pattern 620 (as shown in FIG. 10), finger blood vessel pattern, or both. In an embodiment, multiple data points 640 may correspond to particular locations on a fingerprint. The whorls and loops on a fingerprint may be mapped for further analysis. An additional sensor may be used to detect that the finger is of an appropriate temperature. In an example of use, if a user waves the transaction authentication card over an RF interface, the transaction authentication card light may turn yellow. Upon placement by the user of his finger upon the CMOS sensor, the transaction authentication card light may turn green if the user has his biometric stored on it. A red light may indicate low battery when it is steadily on and may flash when the battery is charged.

Figure 11A:
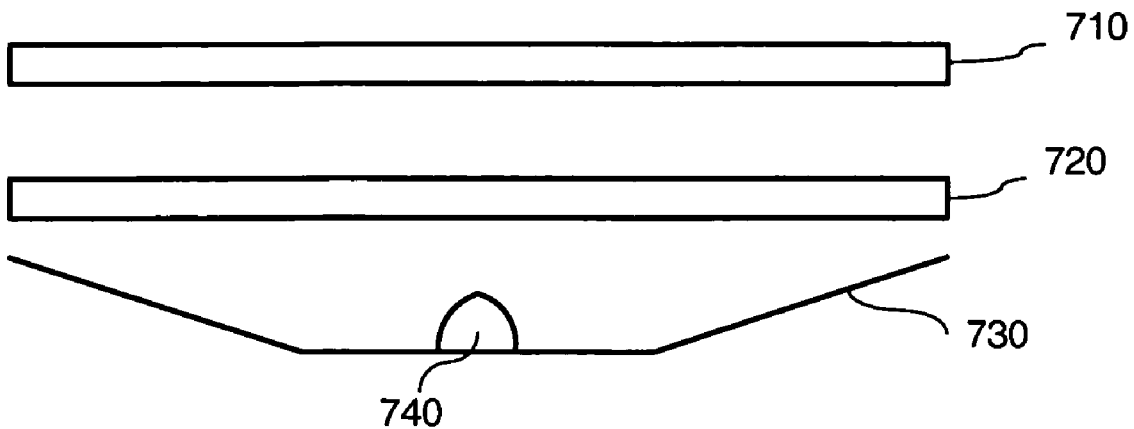
FIGS. 11A and 11B illustrate an embodiment of the present invention in which the display uses color pass filters.
Figure 11B:
Figure 11B:
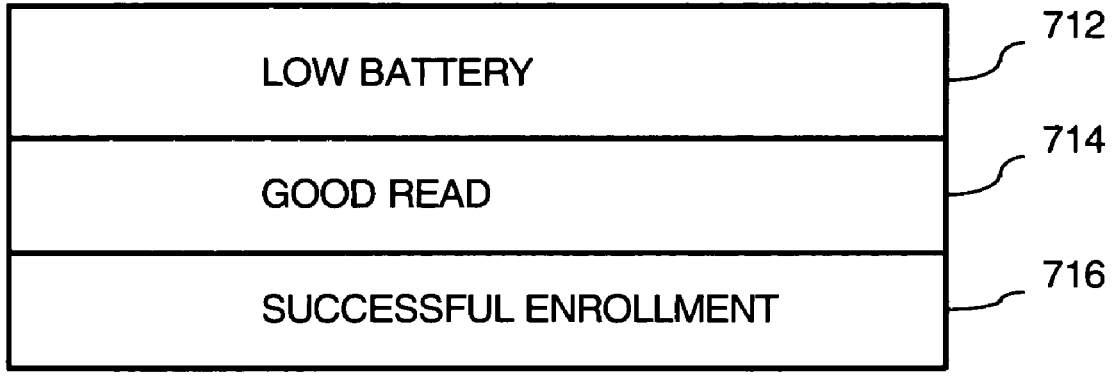

FIGS. 11A and 11B illustrate an embodiment of a display in which a tricolor LED is used with three side-by-side color pass filters. For an LED 740 that transmits yellow, green, and red, color filters 720 that pass only yellow spectrum light, green spectrum light, or red spectrum light preferably are used. A reflector 730 directs the light to achieve greater light efficiency. Top panel 710 may be implemented as three side-by-side panels 712, 714, 716. For example, one panel 712 may contain text inscribed or printed on the panel surface that reads "LOW BATTERY." This panel may be located over a yellow spectrum light only pass filter 720. When the LED transmits yellow light indicating a low battery, only panel 712 is lit. In an embodiment, only when red, green, or yellow light is emitted is one and only one panel lit. In another embodiment, the LED may alternate between colors so as to permit two or more panels to be lit simultaneously. The LED may be formed as part of a tape.

Figure 12A:
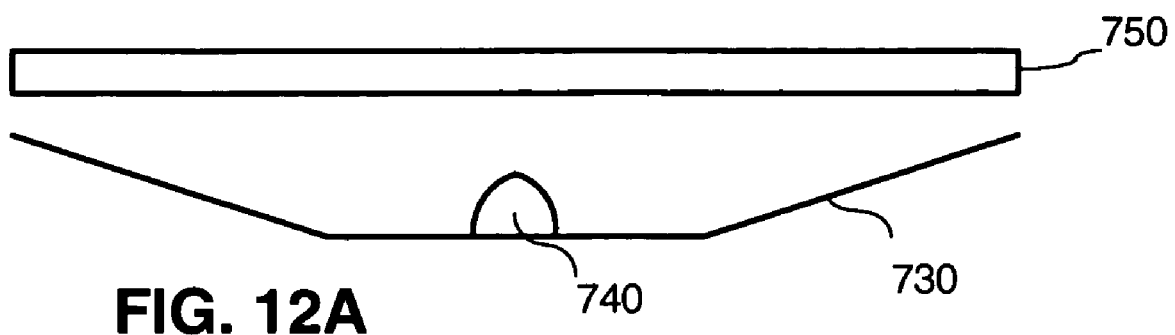
FIGS. 12A and 12B illustrate an embodiment of the present invention in which the display uses a liquid crystal display.
Figure 12B:
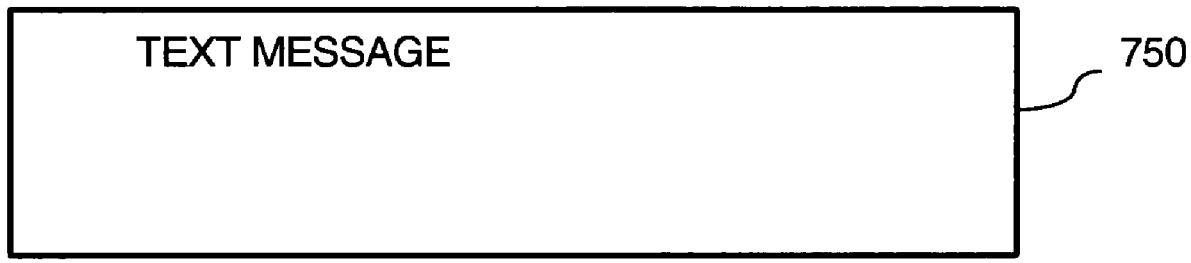

FIGS. 12A and 12B illustrate and embodiment of a display in which an LCD is used. The LCD 750 is backlit by a monochromatic or multicolor light source, such as an LED 740. To achieve greater efficiency in light usage, a reflector 730 is preferably used. The LCD 750 may have color filters when the light source is a white light source. In an embodiment, incident light may be used alone or in conjunction with the light source. Use of an LCD permits a great range of messages to be displayed on the LCD 750. The LCD may be a roll up flexible panel. A passive matrix LCD offers lower cost and is preferred; however, an active matrix LCD may be used for applications requiring better resolution. The liquid crystal material of the LCD may be untwisted nematic, twisted nematic, cholesteric, discoidal, or the like. Polarizers, microlenses, and other optical elements may be used. The display may depict images downloaded by the user, such as a photo, and must be capable of displaying text of at least one alphanumeric character. Other displays may be used such as electrochromic or electroluminescent displays.

Figure 13:
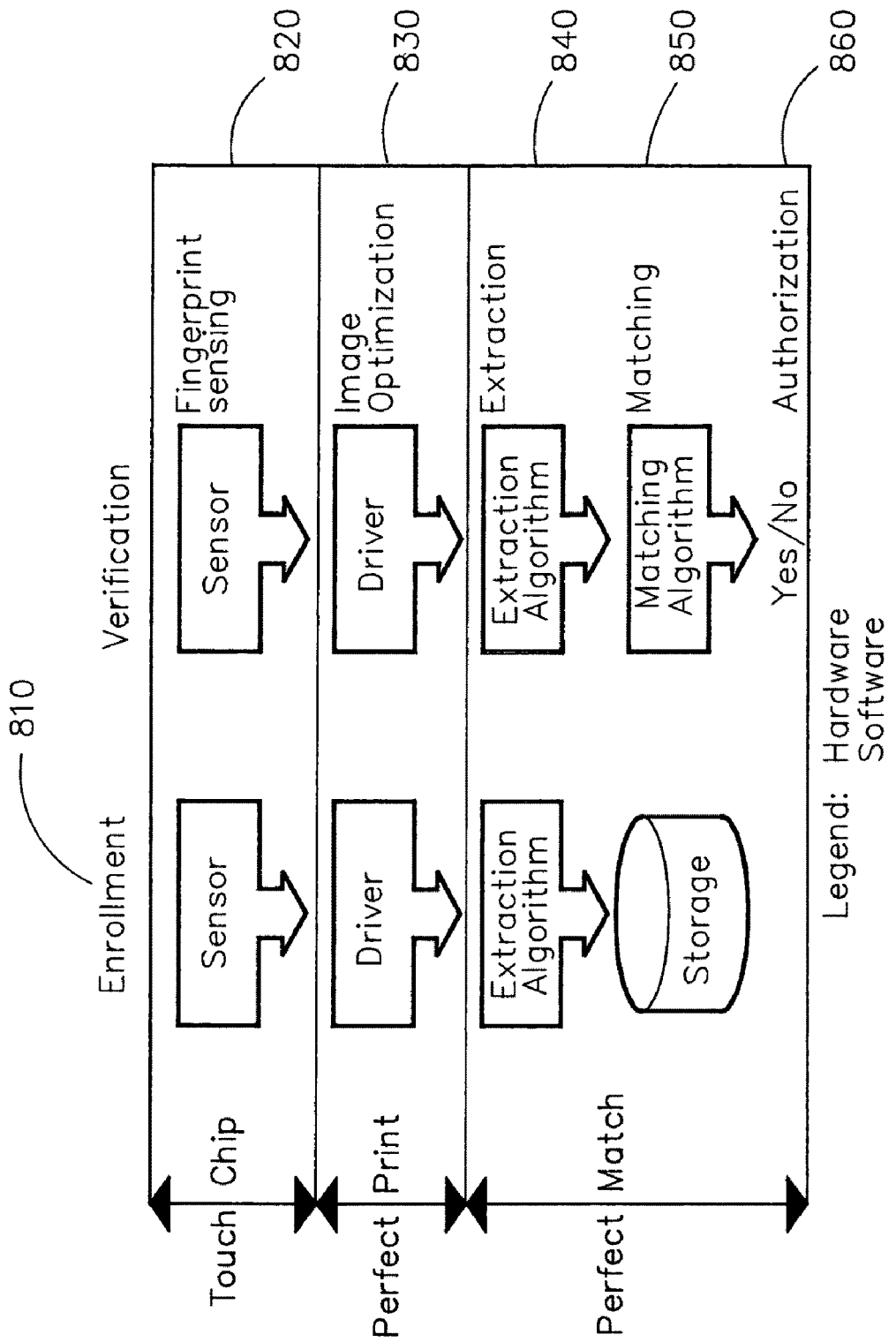
FIG. 13 illustrates an embodiment of the method of the present invention including enrollment and verification.

FIG. 13 illustrates an embodiment of the method of the present invention including enrollment and verification. In an exemplary use of the present invention, a tab is preferably pulled to engage the internal battery. By placement of a finger (e.g., thumb and/or middle) on the fingerprint window, that user's bioprint is stored in a processor (e.g., LSI). Enrollment is on the card only and does not require a PC or other device for biometric enabling. The default RF ID needs to be entered for the access control system for ID acknowledgement. Remote enrollment or local enrollment may be performed. Remote enrollment is a process similar to credit card activation. Local enrollment may be achieved by placing the transaction authentication card in an interface dock allowing a higher level of enrollment control. Software loaded on a desktop may prompt for a personal identification number before allowing the transaction authentication card to enroll the biometric. The user places a finger on the fingerprint window for authentication and verification that the user is authorized to use the transaction authentication card. If the fingerprint is not acceptably recorded, the card may prompt for a redo such as by providing a display or lighting an LED a particular color. Access may be accomplished by placing the transaction authentication card within several inches of an HID plate. Likewise, when the device is used with a desktop input device for terminal or computer access and/or internet credit card transactions, the transaction authentication card is placed in an interface box to complete a smart card transaction or send an encrypted token for terminal access.

Figure 14:
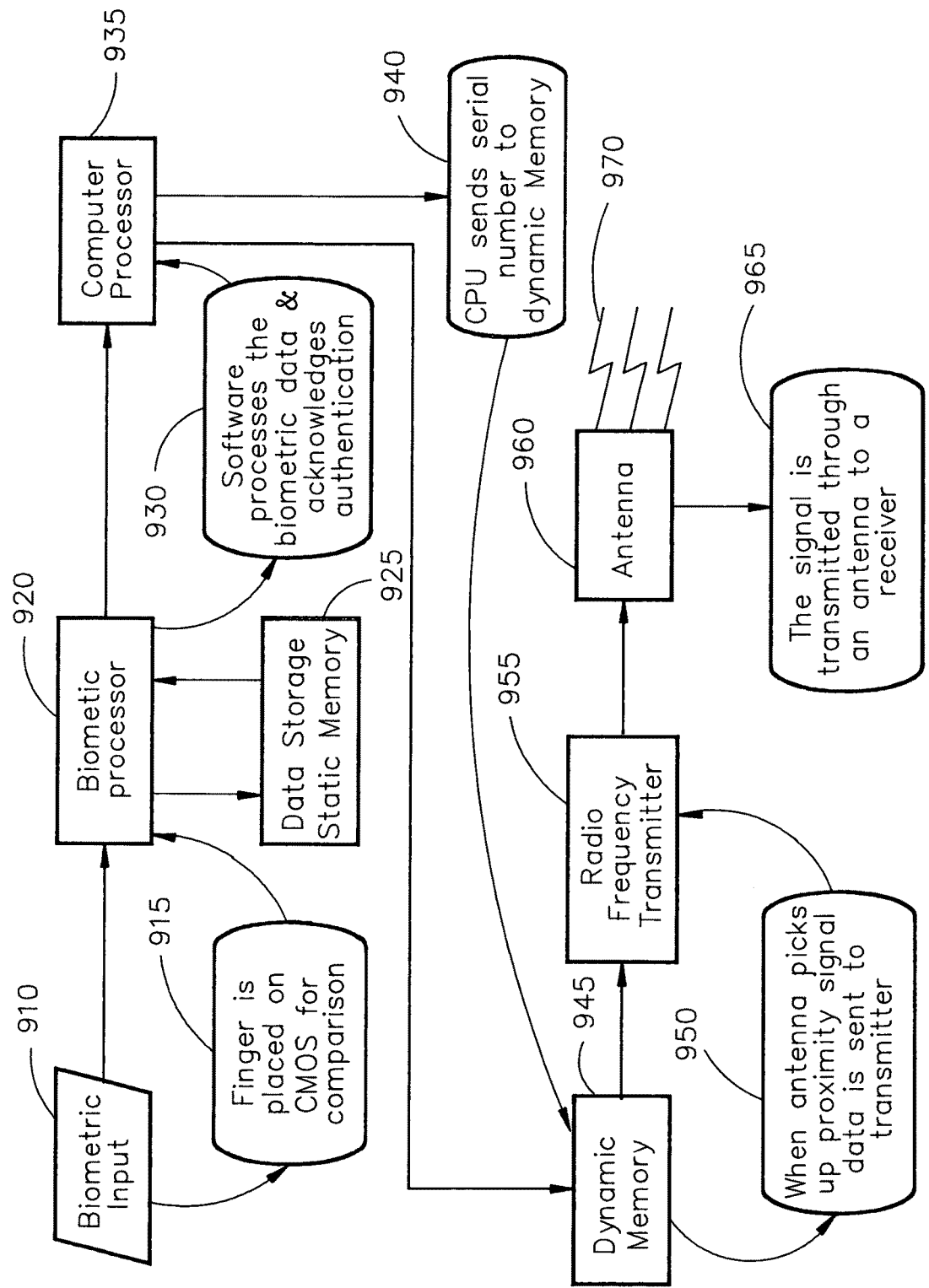
FIG. 14 illustrates an embodiment of a method of gaining limited access using a transaction authentication card with biometric input in the present invention.

FIG. 14 shows a flowchart for an exemplary process of the present invention. A biometric input 910, such as a finger placed on a CMOS sensor 915, is processed by a biometric processor 920. A template of acceptable fingerprint patterns is retrieved from memory 925, such as a read only memory (or static random access memory for applications which erase biometric data when power is lost on the card). The processor software processes the biometric data and acknowledges authentication 930. If the fingerprint is not authenticated, an alert may be set by the transaction authentication card or the transaction authentication card reader. For an authenticated fingerprint, the processor (e.g., central processing unit) sends the serial number to dynamic memory 940, 945. Dynamic memory is either a dynamic random access memory or a static random access memory. When the transaction authentication card antenna receives a proximity sensor from the transaction authentication card reader 950, data is sent to the transaction authentication card transmitter 955. The encoded data is transmitted through the antenna 960, 965 to a receiver as a wireless signal 970, such as radio frequency or infrared. The antenna is preferably a loop antenna. The loop antenna may have a cross sectional area only slightly smaller than the major planar extension of the transaction authentication card body.

Figure 15:
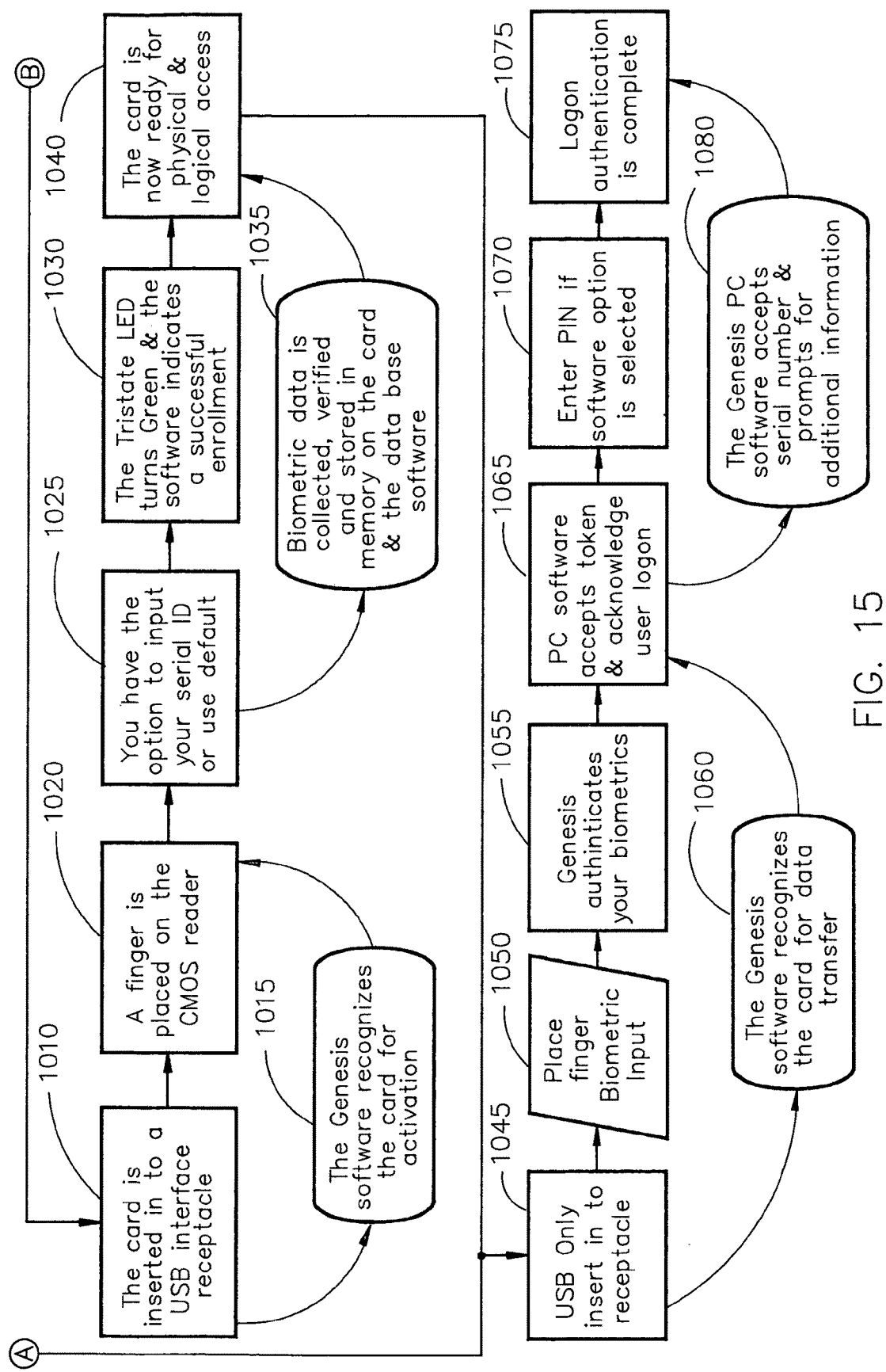
FIG. 15 illustrates an embodiment of a method of enrollment and initial use of the transaction authentication card of the present invention using a universal serial bus (USB) connection.

FIG. 15 shows a flowchart for an exemplary process for initial use and enrollment in the present invention. The transaction authentication card is inserted into a USB interface receptacle 1010. The biometric input is received 1020. The transaction authentication card processor software and/or hardware recognizes that the card is to be activated 1015. This recognition may be achieved by the setting of a flag bit in a register in the transaction authentication card. An option may be presented to the user in which the user may input his or her own serial identification number or may simply accept a default identification number (or, code) 1025. A tristate LED may turn green to indicate that the software has acknowledged successful enrollment by the user 1030. The biometric data is collected, verified, and stored in memory on the transaction authentication card and in the database software 1035. Then, the transaction authentication card is ready for physical and logical access 1040.

FIG. 15 also shows a flowchart for an exemplary process of initial use using a USB receptacle. The transaction authentication card may have a USB port 1045 from which a USB cable may connect the transaction authentication card to an external device, such as a personal computer. The user's biometric input is received 1050 and authenticated 1055. The transaction authentication card software recognizes the transaction authentication card for data transfer 1060. A token from the transaction authentication card is accepted by the personal computer software and the personal computer acknowledges a user logon 1065. A personal identification number may be required by the personal computer software application 1070. The personal computer software accepts the transaction authentication card serial number and prompts for additional information 1080. Logon authentication is completed 1075. It is contemplated that after the completion of enrollment, when the card is ready for physical and logical access in step 1040, that the initial use process allows the transaction authentication card to be utilized for interfacing with a human interface device such as the initial use process described below, in the method shown in FIG. 16, beginning with step 1145.

Figure 16:
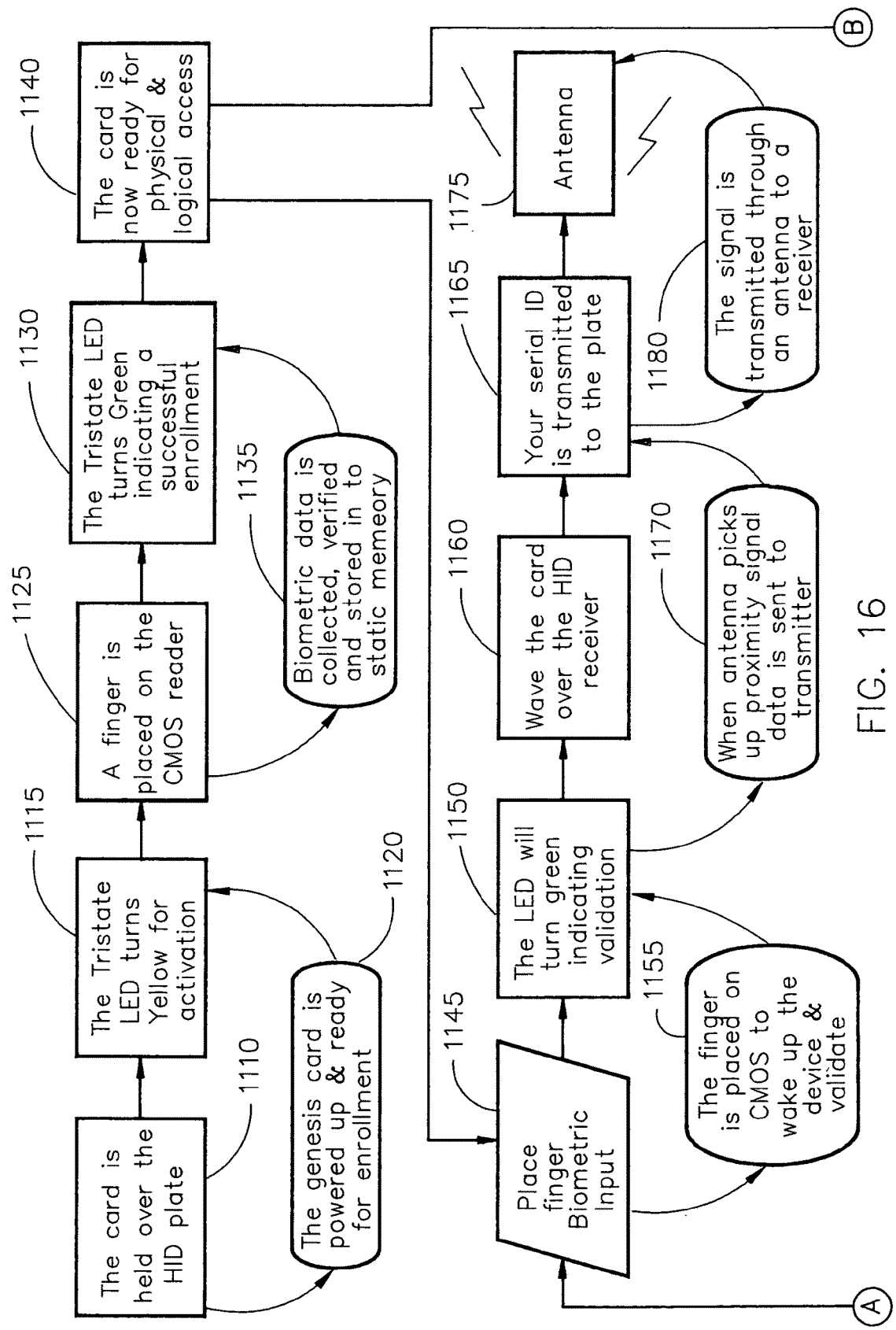
FIG. 16 illustrates another embodiment of a method of enrollment and initial use of the proximity of the present invention using wireless communications.
Figure 17:
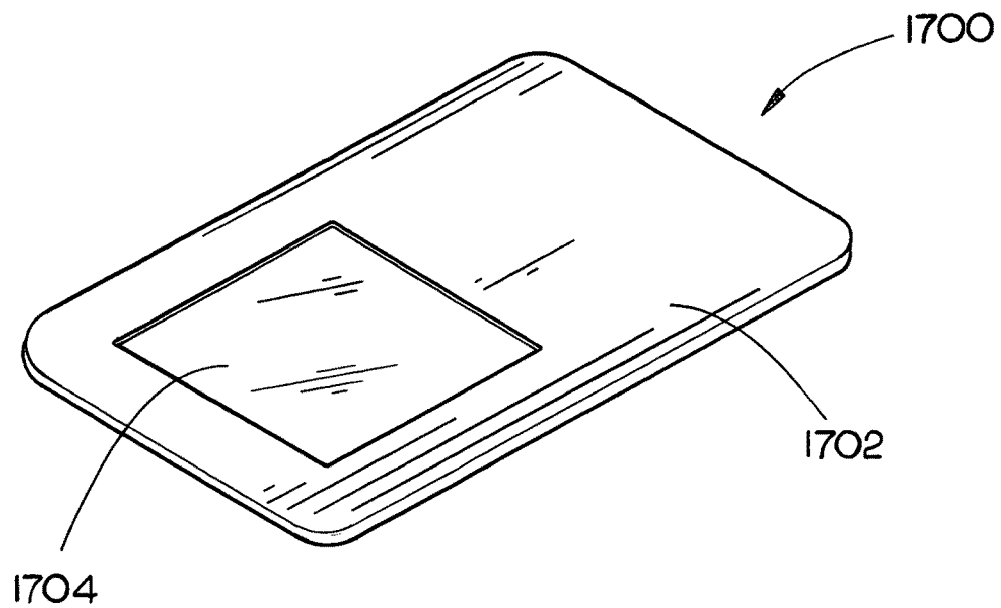
FIG. 17 illustrates a transaction authentication card including a biometric sensor in accordance with an exemplary embodiment of the present invention.
Figure 18:
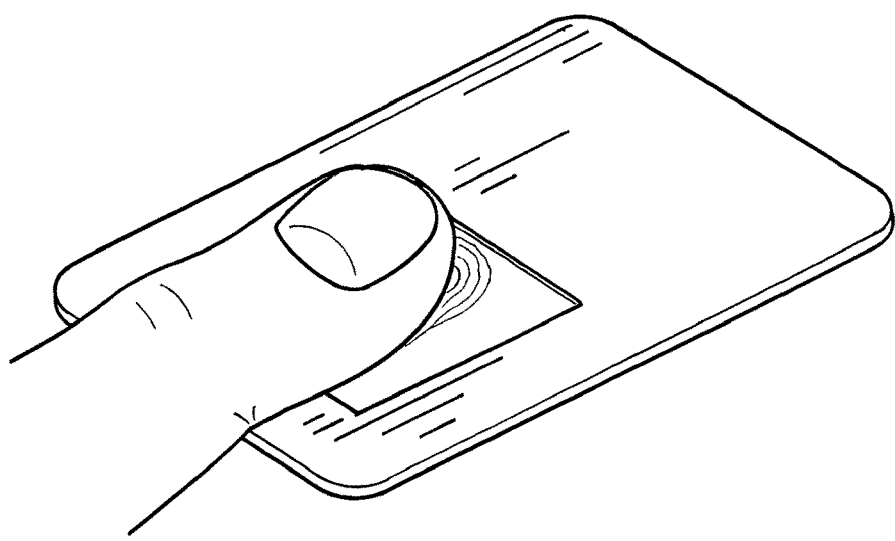
FIG. 18 illustrates a biometric feature (a user's thumbprint) engaging with the biometric sensor of the transaction authentication card.

FIG. 16 shows a flowchart for another exemplary process for initial use and enrollment in the present invention. In this embodiment, enrollment and initial use is achieved wirelessly. The transaction authentication card 1110 is placed over a human interface device (HID) plate interfaced to a CPU. The transaction authentication card is powered up for enrollment 1120. An optional tristate LED (light emitting diode) turns yellow for activation 1115. Biometric input is received 1125, such as by placing a finger on a CMOS sensor. The biometric data is collected, verified, and stored into static memory 1135. The tristate LED turns green indicating a successful enrollment 1130. The transaction authentication card is ready for logical and physical access 1140.

In the initial use phase of FIG. 16, the biometric input is received 1145. In the present example, when a finger is placed on the CMOS sensor, the transaction authentication card circuitry wakes up from sleep mode and runs a validation check on the fingerprint 1155. The tristate LED turns green if validation is successful 1150. The transaction authentication card is waved over a human interface device receiver 1160. When the transaction authentication card antenna receives a proximity signal, data is sent to the transmitter 1170. The serial identification data is transmitted 1165 through an antenna 1180, 1175. The antenna is preferably a loop antenna, but may be a quarter wave antenna, a dipole antenna, a half wave antenna, or the like. The antenna may be a fold out antenna or may be attachable to the transaction authentication card housing. The transaction authentication card may have a telescopic antenna for long-range RF transmissions. It is contemplated that after the completion of enrollment, when the card is ready for physical and logical access in step 1140, that the enrollment and initial use process allows the transaction authentication card to be utilized for interfacing with a USB interface receptacle, such as the enrollment and initial use process previously described in reference to the method shown in FIG. 15, beginning with step 1010.

FIGS. 17 through 28 show a preferred embodiment of the transaction authentication card, including a body at least partially encompassing a biometric sensor. The biometric sensor establishes an exposed touch surface for engagement by a user. For example, the user may establish a thumb in contact with the touch surface enabling the biometric sensor, using the tamed frequency modulation (TFM) functionality, to establish an identification of the user, as previously described. In a preferred embodiment, the body of the transaction authentication card includes a first housing which connects with a second housing. The first and second housings at least partially encompass a multi-layered circuit board, as shown in FIGS. 19 and 20, comprising various functional components in communication with one another, as previously described. The circuit board 1900 may be established with a length of 3.3858 inches, width of 2.1260 inches, and height of 0.0464 inches. It is understood that alternate circuit board configurations and communication channels between the various functional components may be employed without departing from the scope and spirit of the present invention. In the current embodiment, the power is supplied by the coin cell battery as previously described.

Further shown in FIGS. 17 through 28, the body of the transaction authentication card has physical dimension commensurate with a standard credit card. This is promoted by the configuration of the circuit board 1900 and functional components. In FIGS. 22 through 28 the transaction authentication card includes a variety of selectors established in various locations about the body of the transaction authentication card. The selectors may be positioned in various manners as contemplated by those of ordinary skill in the art. It is understood that the transaction authentication card is enabled to store the necessary electronic information to conduct transactions in the various function modes which the transaction authentication card may be established. Thus, the transaction authentication card has the memory and processing capacity to receive and store the required information associated with these types of cards. For example, the transaction authentication card may store the electronic identification information for numerous accounts held by a user and be able to transmit the appropriate information as is required by the selected use of the transaction authentication card.

Various embodiments may be implemented for the transaction authentication card of the present invention. The biometric input need not be limited to fingerprint matching, but may include other forms of biometric identification. The transaction authentication card may allow multiple finger print registration. Patterns for each finger of the user may be entered into the transaction authentication card memory. Other parts of the user's anatomy, such as the retinal patterns of the eyes, may be used. The sensor pad may be adapted to require the placement of two or more digits and may function in an either/or mode. A temperature sensor may also be employed to verify that the finger is living. This may be a redundant feature in some embodiments since the sensor pad and processor may already be implemented to recognize not only a finger print pattern but also the blood flow through a given finger. In fact, the blood flow pattern through a finger may be used as an alternative to a fingerprint. Flexible circuit technology may be used. The transaction authentication card may store credit card numbers, social security numbers, employee identification numbers, and the like. Although radio frequency transmission is preferred, other wireless transmission formats may be implemented, such as infrared. Misalignment or other problems in entering the biometric input may be signaled by an audible alarm or visual indicator on the transaction authentication card and/or transaction authentication card reader. A speaker for sound and/or alarms may be incorporated in the card. A protective adhesive sheet may cover one or both sides of the card. If the biometric side of the card is covered with a protective adhesive sheet, the protective adhesive sheet over the biometric sensor may be cut out to promote effectiveness of the sensor operation. The protective adhesive sheet may allow the adhering of print images or text.

Manufacturing of the transaction authentication card may occur using various materials and manufacturing methods. For example, the body of the transaction authentication card may be comprised of two or more housings which are joined together to at least partially encompass the component features, such as the circuit board, biometric sensor, and the like. Alternatively, the housing may be formed by a method whereby the component features are integrated with the body as a single piece. It is understood that the wedge of the quick access transaction authentication card and other alternative selectors as contemplated by the present invention are capable of being included in the manufacturing process.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages, the form hereinbefore described being merely an explanatory embodiment thereof. It is the intention of the following claims to encompass and include such changes.

What is claimed is:

1. A transaction authentication card, comprising:
a body for at least partially encompassing a circuit board;
a biometric sensor communicatively coupled with the circuit board;
a memory coupled with the circuit board in the body, the memory for storage of biometric data;
a processor disposed upon the circuit board in the body, the processor communicatively coupled with the memory and the biometric sensor, the processor for retrieving stored biometric data from the memory, the processor exclusively performing enrollment of the biometric feature of the user, the processor executing a biometric algorithm for comparing the biometric feature of the user with the stored biometric data;
a security device disposed within the body, the security device erases data from said memory when said body is opened, wherein said security device includes a light sensitive diode and erases data from said memory when said light sensitive diode is exposed to light; and
a wireless transmitter capable of generating a wireless signal, wherein said wireless signal is transmitted on a one-to-one validation of the biometric feature.

2. The transaction authentication card as claimed in claim 1, wherein said biometric data is encrypted during storage within said memory.

3. The transaction authentication card as claimed in claim 1, further comprising a visual indicator.

4. The transaction authentication card as claimed in claim 1, wherein said visual indicator is suitable for indicating when said biometric feature is received by said transaction authentication card.

5. The transaction authentication card as claimed in claim 1, wherein said wireless signal is generated when a signal from a security module has been received.

6. The transaction authentication card as claimed in claim 1, further comprising a battery.

* * * * *